United States Patent
Eguchi

(10) Patent No.: US 9,189,714 B2
(45) Date of Patent: Nov. 17, 2015

(54) APPARATUS AND METHOD FOR ENLARGING OBJECT INCLUDED IN IMAGE DATA, AND STORAGE MEDIUM THEREFOR

(71) Applicant: CANON KABUSHIKI KAISHA, Tokyo (JP)

(72) Inventor: Kimimori Eguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/325,143

(22) Filed: Jul. 7, 2014

(65) Prior Publication Data

US 2015/0015918 A1    Jan. 15, 2015

(30) Foreign Application Priority Data

Jul. 9, 2013   (JP) .................................. 2013-143699

(51) Int. Cl.
| | |
|---|---|
| H04N 1/405 | (2006.01) |
| G06K 15/02 | (2006.01) |
| G06T 5/00 | (2006.01) |
| H04N 1/409 | (2006.01) |
| H04N 1/58 | (2006.01) |

(52) U.S. Cl.
CPC ............ *G06K 15/1872* (2013.01); *G06T 5/001* (2013.01); *H04N 1/4092* (2013.01); *H04N 1/58* (2013.01); *G06T 2207/10008* (2013.01); *G06T 2207/10024* (2013.01); *G06T 2207/20192* (2013.01)

(58) Field of Classification Search
CPC ........... H04N 1/409; H04N 1/58; H04N 1/62; G06T 5/001; G06T 7/0079; G06T 7/0081; G06T 7/0083; G06T 7/0085; G06K 9/40; G06K 9/4604

USPC ........ 358/2.1, 3.13, 3.15, 3.27; 382/199–200, 382/266–274

See application file for complete search history.

(56) References Cited

U.S. PATENT DOCUMENTS

| | | | | |
|---|---|---|---|---|
| 5,712,924 | A  * | 1/1998 | Fujimoto et al. ............... | 382/165 |
| 6,178,262 | B1 * | 1/2001 | Picard et al. ................... | 382/195 |
| 6,236,466 | B1 * | 5/2001 | Chung ............................ | 358/1.9 |
| 7,079,281 | B1 * | 7/2006 | Ng et al. ........................ | 358/1.9 |
| 7,079,287 | B1 * | 7/2006 | Ng et al. ........................ | 358/2.1 |
| 2005/0036175 | A1 * | 2/2005 | Klatchko et al. ............. | 358/3.21 |
| 2006/0204093 | A1 * | 9/2006 | Zhou ............................. | 382/176 |
| 2011/0194129 | A1 * | 8/2011 | Fujiwara ........................ | 358/1.9 |

FOREIGN PATENT DOCUMENTS

JP    2004-122692 A    4/2004

* cited by examiner

*Primary Examiner* — Thomas D Lee
*Assistant Examiner* — Stephen M Brinich
(74) *Attorney, Agent, or Firm* — Canon USA Inc. IP Division

(57) ABSTRACT

An image processing apparatus includes a first determination unit configured to determine whether a pixel included in image data belongs to an edge, a second determination unit configured to determine whether a pixel included in the image data is achromatic, and a processing unit configured to perform process for forming a pixel only with an achromatic color material on a pixel determined as belonging to an edge and being achromatic. In a case where the pixel has been determined as belonging to an edge and being achromatic, the processing unit determines whether the process is to be performed on a pixel adjacent to the pixel which has been determined as belonging to an edge and being achromatic, and, in a case where it has been determined that the process is to be performed, performs the process on the adjacent pixel.

14 Claims, 18 Drawing Sheets

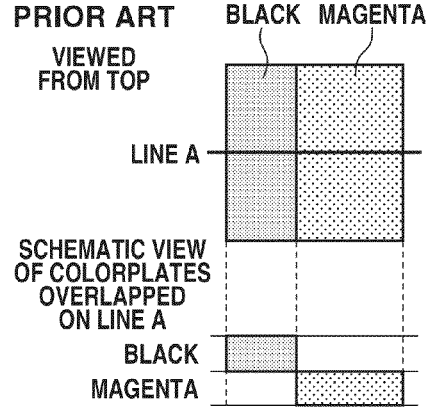
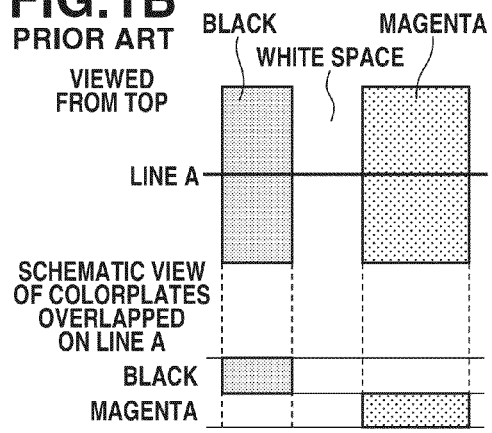
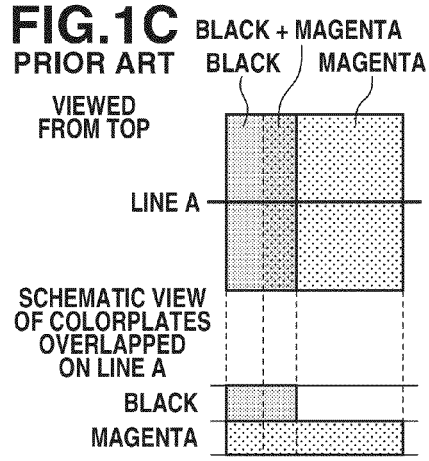
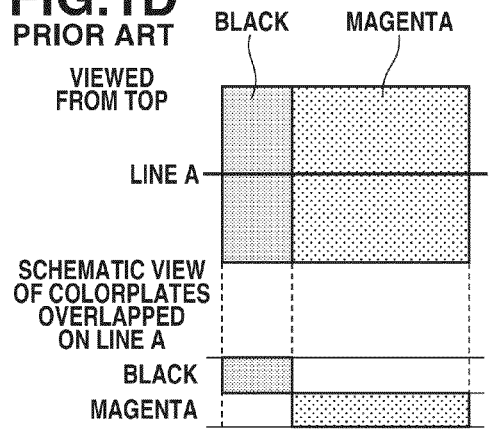
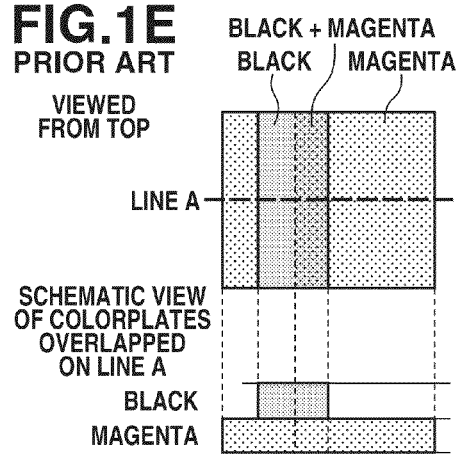

701

702  703

704  705

706

707  708

709  710

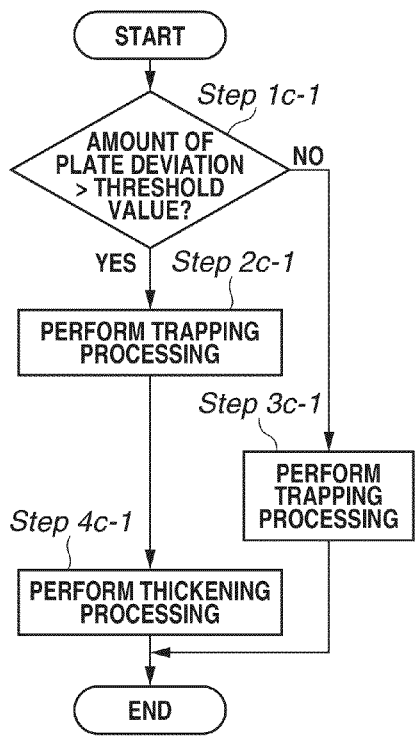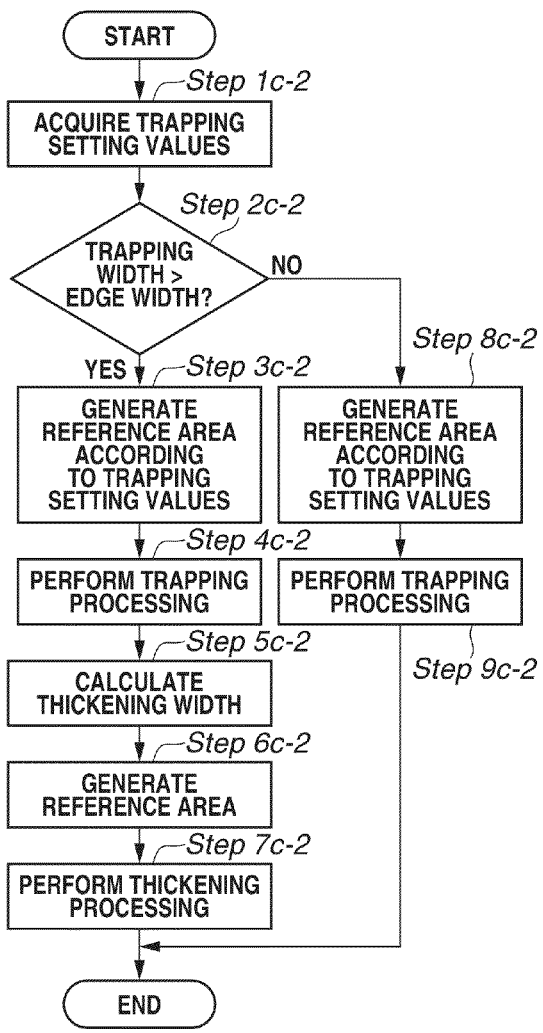

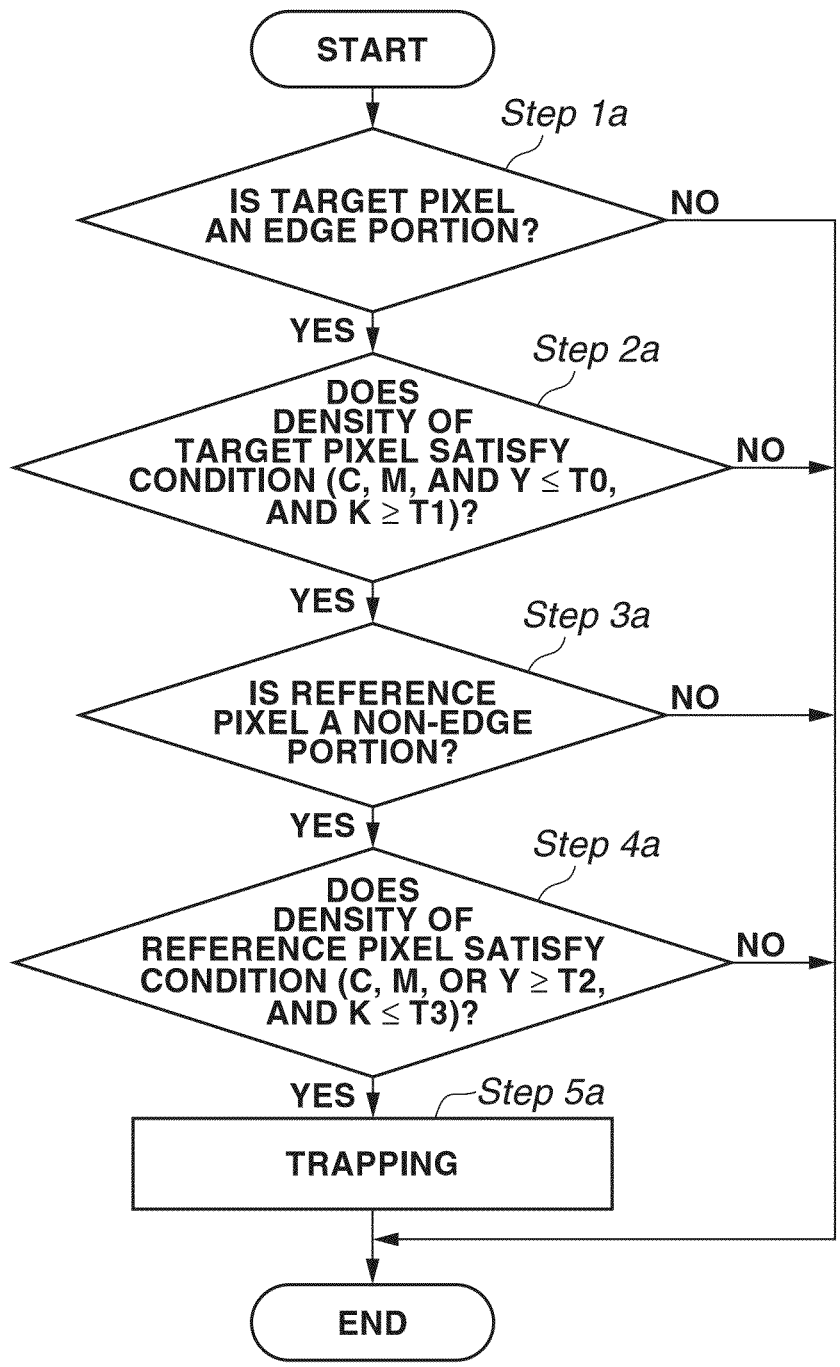

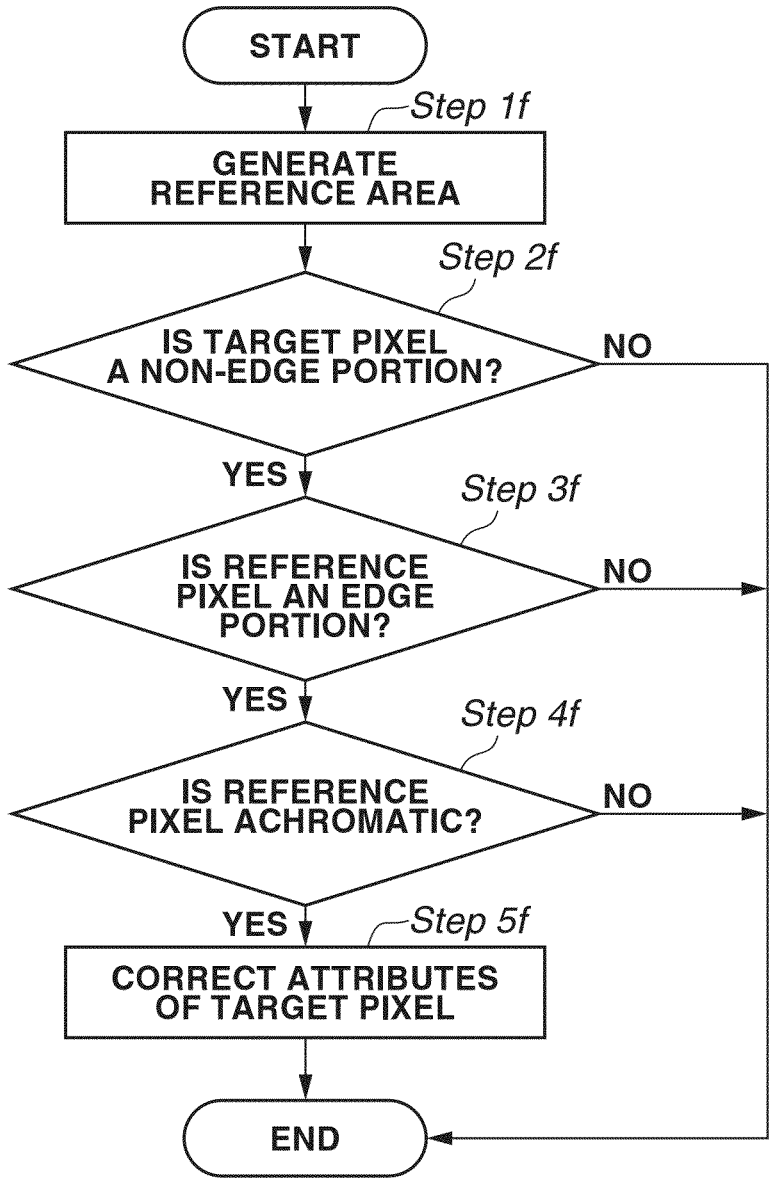

APPARATUS AND METHOD FOR ENLARGING OBJECT INCLUDED IN IMAGE DATA, AND STORAGE MEDIUM THEREFOR

BACKGROUND OF THE INVENTION

1. Field of the Invention

The present disclosure generally relates to imaging and, more particularly, to an apparatus and method for enlarging an object included in image data, and storage medium therefor.

2. Description of the Related Art

There is an apparatus for printing a full color image by using the four process colors (color planes) including C (cyan), M (magenta), Y (yellow), and K (black). In the print process performed by this apparatus such as image data transfer onto a recording medium, a color plane deviation (plane deviation) may arise. Such a plane deviation may cause the color of paper (print medium) to be seen at the boundary between adjacent objects each including a different color plane. This phenomenon is referred to as a white spot.

For example, suppose printing of image data including a black color plane object (K object) and a magenta color plane object (M object) adjacent to the K object. The image data is ideally printed without plane deviation, as illustrated in FIG. 1A. However, in the print process of the relevant image data, if the black plane (K plane) shifts to the left of the magenta plane (M plane), a white spot arises between the K and the M objects, as illustrated in FIG. 1B.

Trapping processing is a technique for preventing a white spot. The trapping processing enlarges one color plane object included in the image data toward the other color plane object adjacent to the one color plane object. With the trapping processing, one color plane object and the other color plane object overlap with each other at the boundary between the two objects in advance. When the image data having undergone the trapping processing is ideally printed without plane deviation, the K and the M objects overlap with each other at the boundary of the two objects, as illustrated in FIG. 1C. On the other hand, if a plane deviation arises in the print process of the image data having undergone the trapping processing, the image data is printed as illustrated in FIG. 1D. Specifically, since the K object has been enlarged toward the M object in advance, a white spot does not arise even if a plane deviation arises.

Japanese Patent Application Laid-Open No. 2004-122692 discusses a technique for allowing a user to set a pixel width, i.e., a width by the number of pixels (referred to as a trapping width) by which one color plane object is to be enlarged toward the other color plane object.

Suppose a case where a large trapping width is set in Japanese Patent Application Laid-Open No. 2004-122692. In this case, if the width of the K object is narrow, the M object is enlarged to protrude from the left-hand side of the K object, as illustrated in FIG. 1E. Accordingly, a color which is not originally present appears at the left-hand boundary of the K object, possibly resulting in image quality degradation. Such image quality degradation arises not only when a large trapping width is set but also when a plane deviation of the M object becomes larger toward the K object (to the left).

SUMMARY OF THE INVENTION

According to an aspect of the present disclosure, an image processing apparatus includes an input unit configured to input image data, a first determination unit configured to determine whether a pixel included in the input image data belongs to an edge, a second determination unit configured to determine whether a pixel included in the input image data is achromatic, and a processing unit configured to perform a process for forming a pixel only with an achromatic color material on a pixel determined as belonging to an edge and being achromatic by the first and the second determination units. In a case where the pixel has been determined as belonging to an edge and being achromatic, the processing unit determines whether the process is to be performed on a pixel adjacent to the pixel, and, in a case where it has been determined that the process is to be performed, performs the process on the adjacent pixel.

Further features of the present disclosure will become apparent from the following description of exemplary embodiments with reference to the attached drawings.

BRIEF DESCRIPTION OF THE DRAWINGS

FIGS. 1A to 1E illustrate trapping processing.

FIGS. 9A and 9B are flowcharts illustrating trapping processing and thickening processing, respectively.

FIG. 10 is a flowchart illustrating trapping processing.

FIG. 18 is a flowchart illustrating processing for correcting edge attributes according to the fourth exemplary embodiment.

DESCRIPTION OF THE EMBODIMENTS

Various exemplary embodiments, features, and aspects of the disclosure will be described in detail below with reference to the drawings.

A first exemplary embodiment for embodying the present disclosure will be described below with reference to the accompanying drawings. The present exemplary embodiment will be described below with respect to an image forming apparatus for controlling enlargement of different color plane objects based on a trapping width.

<Overall System Configuration>

An image forming apparatus 101 according to the present exemplary embodiment is connected with an information processing apparatus 102, such as a personal computer (PC), via a local area network (LAN) 110. The LAN 110 is connected with a wide area network (WAN) 120, such as the Internet.

<Hardware Configuration of Image Forming Apparatus>

Figure 2:
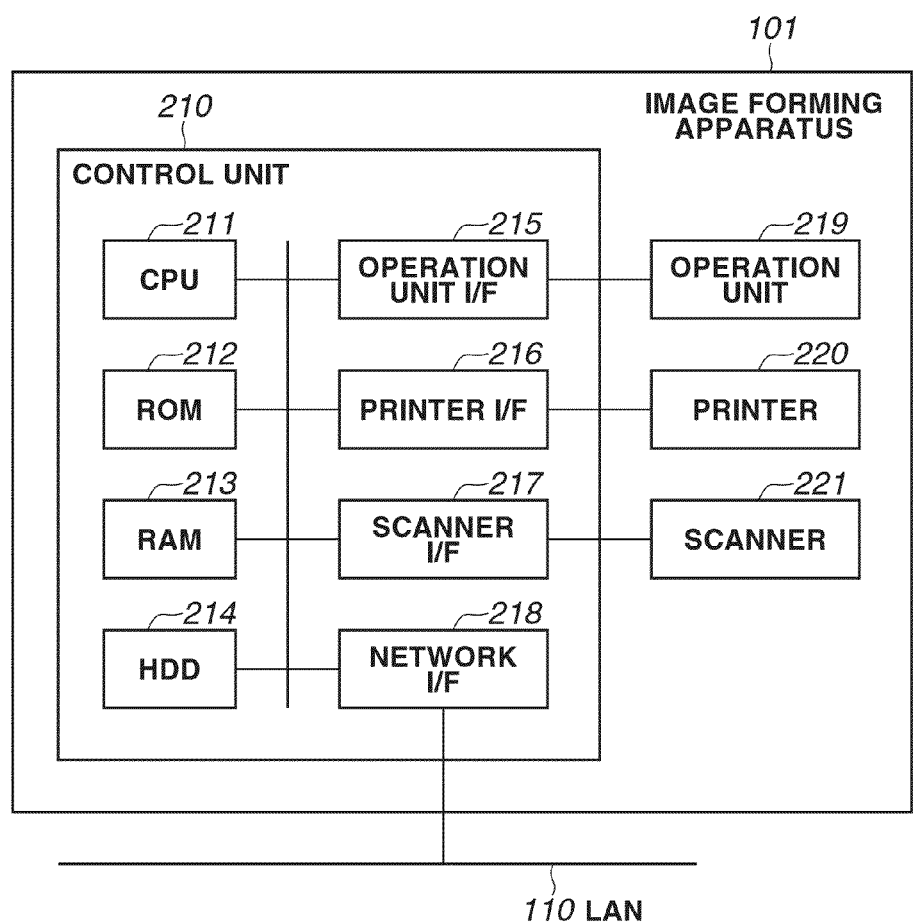
FIG. 2 is a block diagram illustrating a hardware configuration of an image forming apparatus.

FIG. 2 is a block diagram illustrating a hardware configuration of the image forming apparatus 101.

The image forming apparatus 101 includes a control unit 210, an operation unit 219, a printer 220, and a scanner 221. The control unit 210 connects with each unit, and transmits and receives information to/from each unit.

The operation unit 219 is provided with a liquid crystal display (LCD) unit having a touch-panel function, and a keyboard. The operation unit 219 is provided with an authentication apparatus for receiving user authentication in the case of performing user authentication by using a card. The operation unit 219 displays information received from the control unit 210 on the LCD unit, and transmits to the control unit 210 information received from a user via the LCD unit, the keyboard, and the authentication apparatus. As used herein, the term "unit" generally refers to any combination of software, firmware, hardware, or other component that is used to effectuate a purpose.

The printer 220 includes an electrophotographic printer engine including developer of a plurality of process colors, and prints image data received from the control unit 210 onto a print medium, such as paper. The present disclosure may also be an ink-jet printer engine including ink of a plurality of process colors.

The scanner 221 reads a document placed on a document positioning plate by using a charge-coupled device (CCD), generates image data of the document, and transmits the image data to the control unit 210.

The control unit 210 totally controls the entire operation of the image forming apparatus 101. The control unit 210 includes a central processing unit (CPU) 211, a read only memory (ROM) 212, a random access memory (RAM) 213, a hard disk drive (HDD) 214, an operation unit interface (I/F) 215, a printer I/F 216, a scanner I/F 217, and a network I/F 218.

The CPU 211 reads a control program stored in the ROM 212, and executes various controls, such as reading control and transmission control. The RAM 213 is used as a main memory for the CPU 211, and a temporary storage area, such as a work area. The HDD 214 stores image data, various programs, and various information tables.

The operation unit I/F 215 connects with the operation unit 219, and transmits and receives information between the control unit 210 and the operation unit 219.

The printer I/F 216 connects with the printer 220, and transmits and receives information between the control unit 210 and the printer 220.

The scanner I/F 217 connects with the scanner 221, and transmits and receives information between the control unit 210 and the scanner 221.

The network I/F 218 connects with the LAN 110, and transmits and receives image data and information between the control unit 210 and other apparatuses connected to the LAN 110.

<Software Configuration of Image Forming Apparatus>

Figure 4:
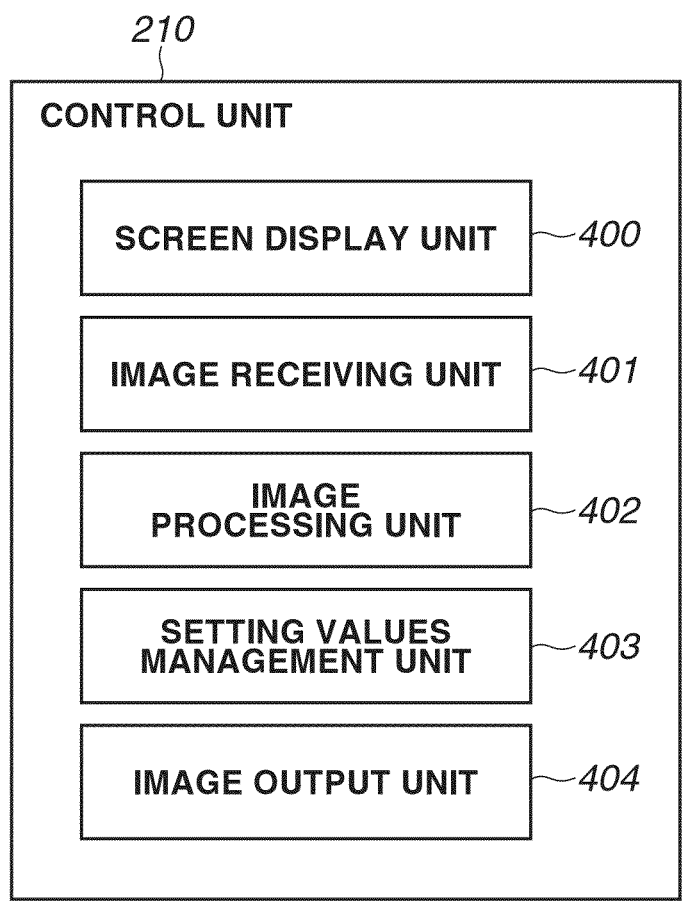
FIG. 4 illustrates a software configuration of the image forming apparatus.

FIG. 4 illustrates a software configuration of the control unit 210. Each processing unit (software module) illustrated in FIG. 4 is implemented when the CPU 211 in the image forming apparatus 101 executes a control program stored in the ROM 212.

The control unit 210 functions as a screen display unit 400, an image receiving unit 401, an image processing unit 402, a setting values management unit 403, and an image output unit 404.

The function of each processing unit will be described below.

The display unit 400 displays setting screens for setting values used for various processing on the operation unit 219 via the operation unit I/F 215. The display unit 400 also receives a user-input instruction from the operation unit 219 via the operation unit I/F 215.

The image receiving unit 401 receives image data via the scanner I/F 217 and the network I/F 218. For example, when copying a document, the image receiving unit 401 receives image data generated by the scanner 221, via the scanner I/F 217. Further, when printing data generated by the information processing apparatus 102, the image receiving unit 401 receives image data (such as page description language (PDL) data) generated by the information processing apparatus 102, via the network I/F 218.

The image processing unit 402 performs various image processing on the received image data. Image processing performed by the image processing unit 402 will be described in detail below.

The setting values management unit 403 manages setting values received by the user via the operation unit I/F 215 and setting values preset by the user. Setting values includes, for example, the width, the direction, and the density of trapping. More specifically, settings values includes the trapping width (the number of pixels), the trapping direction (up, down, right, and left), and the trapping density (0 to 100% values). The trapping width is used to determine the number of pixels by which one color plane object is to be enlarged toward the other color plane object. When enlarging one color plane object toward the other color plane object, the trapping direction is used to determine in which direction (for example, up, down, right, or left) the one object is to be enlarged. The trapping density is used to determine what percentage of the color of one color plane object to be enlarged toward the other color plane object. In other words, what percentage of one color plane object is used as the color of the enlarged portion.

The image output unit 404 performs print processing on image data having undergone image processing by the image processing unit 402 according to setting values managed by the setting values management unit 403. The image output unit 404 transmits the processed image data to the printer 220 via the printer I/F 216. The printer 220 prints the image data on a recording medium, such as paper, through the electrophotographic print process.

<Each Processing by Image Processing Unit>

Figure 5:
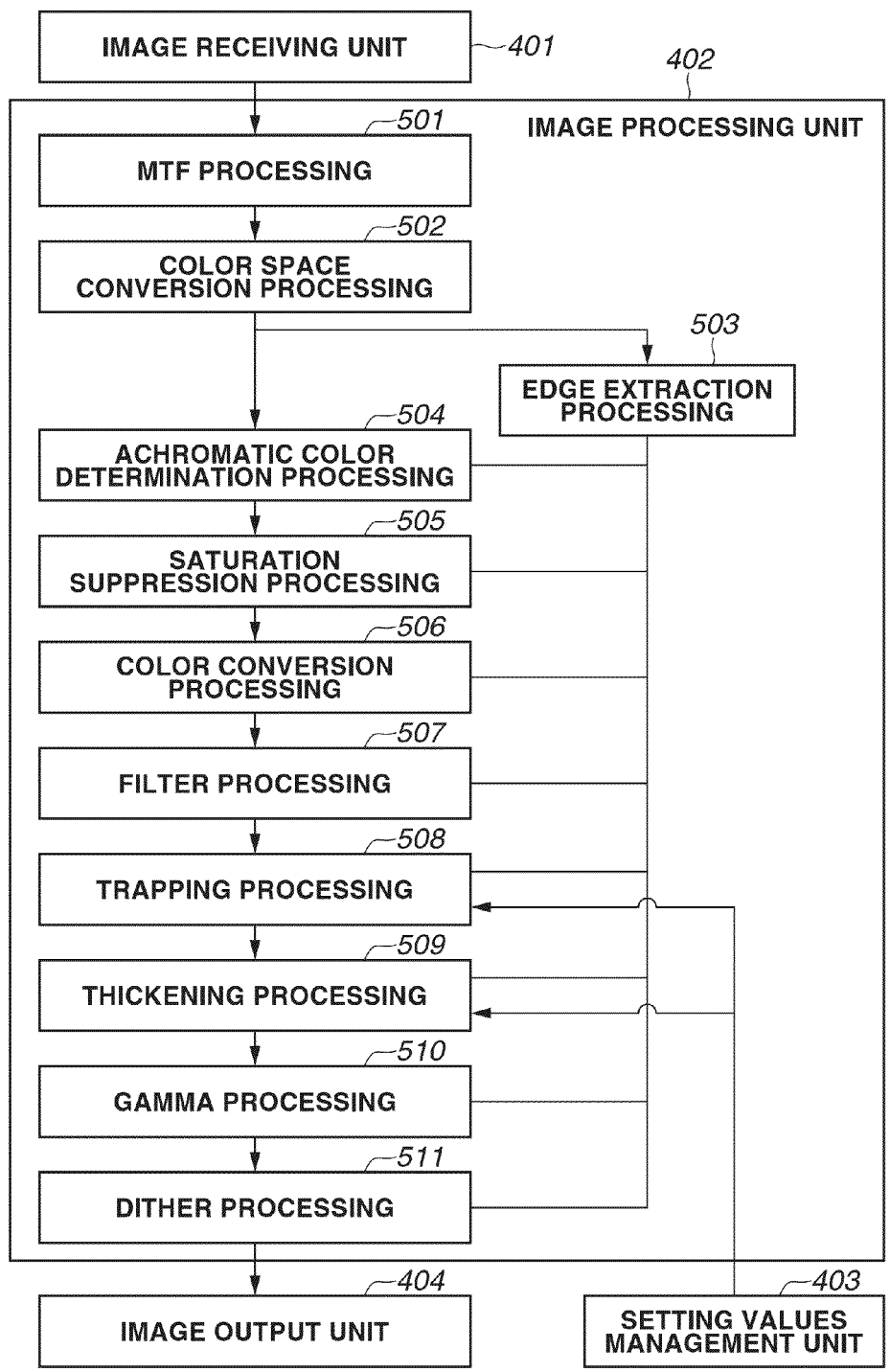
FIG. 5 illustrates an image processing configuration in an image processing unit.

The configuration of the image processing unit 402 and each processing performed by the image processing unit 402 will be described below with reference to FIG. 5. Each processing performed by the image processing unit 402 illustrated in FIG. 5 is implemented when the CPU 211 executes a control program stored in the ROM 212.

First, the image receiving unit 401 transmits received image data to the image processing unit 402. In the case of image data generated by the scanner 221, for example, the image receiving unit 401 transmits to the image processing unit 402 bitmap image data obtained by smoothing the entire image data to mask halftone dots. In the case of PDL data received from the information processing apparatus 102, for example, the image receiving unit 401 transmits to the image processing unit 402 bitmap image data obtained by rasterizing the PDL data by a raster image processor (RIP) (not illustrated) in the image forming apparatus 101.

Then, the image processing unit 402 performs modulation transfer function (MTF) processing 501 on the received image data to correct the MTF of main- and sub-scannings.

Then, the image processing unit 402 performs color space conversion processing 502 on the image data having undergone the MTF processing 501, for example, to convert the color space of the scanner 221 to a color space not dependent on the scanner 221.

Then, the image processing unit 402 performs edge extraction processing 503 on the image data having undergone the color space conversion processing 502 to extract image edges (object contours). For example, in the case of image data composed of red, green, and blue (RGB) three-channel signal values (pixel values), the image processing unit 402 converts the RGB signal values into gray one-channel signal values, and performs filter processing on the converted signal, for example, by using a Sobel filter. As a result of the filter processing, the image processing unit 402 determines a pixel having a value larger than a threshold value as an edge pixel, and extracts an area having such pixels as an edge portion. The edge portion is also simply referred to as an edge. As described above, after the filter processing, the edge extraction processing 503 extracts as an edge a pixel having a signal (pixel value) larger than a threshold value. This means that, by changing the threshold value, the edge extraction processing 503 can control the width (edge width) of an edge to be extracted. A smaller threshold value enables extracting a larger edge width. The relation between the edge width extracted by the edge extraction processing 503 and the image quality will be described below.

Then, the image processing unit 402 performs achromatic color determination processing 504 on the image data having undergone the color space conversion processing 502 to determine whether an edge pixel determined by the edge extraction processing 503 is achromatic. The image processing unit 402 performs the achromatic color determination processing 504 by converting the image data into image data in the Lab color space represented by luminance and color difference, and determines whether each of the absolute values of the color differences a and b is smaller than a predetermined threshold value. The image processing unit 402 may perform the achromatic color determination processing 504 by using other well-known methods. When an edge pixel is determined to be achromatic, the image processing unit 402 outputs an achromatic color signal indicating that the edge pixel is achromatic. In this case, the image processing unit 402 prevents an edge pixel having a luminance L higher than a predetermined threshold value (although the color differences a and b are almost zero) from being determined to be achromatic. This applies to light gray having a high luminance. Thus, by determining that a light gray edge pixel is not achromatic, a light gray edge pixel can be prevented from being monochromatized into black (K-monochromatized) by saturation suppression processing 505 and color conversion processing 506 in the following stages. This is because, when light gray is K-monochromatized, the luminance extremely decreases, resulting in image quality degradation.

Then, the image processing unit 402 performs saturation suppression processing 505 on the image data having undergone the achromatic color determination processing 504 to convert a pixel signal determined to be an edge pixel by the edge extraction processing 503 and determined to be achromatic by the achromatic color determination processing 504. For example, the image processing unit 402 converts the RGB three-channel signal values of the image data on an equal quantity basis (R=G=B). Thus, an achromatic edge pixel (black character edge portion) can be K-monochromatized by the color conversion processing 506.

The achromatic color determination processing 504 and the saturation suppression processing 505 have been described above as different processing. Specifically, the image processing unit 402 performs the achromatic color determination processing 504 and then performs the saturation suppression processing 505 on all pixels determined to be an edge pixel. However, the method is not limited thereto. For example, the image processing unit 402 may sequentially perform the achromatic color determination processing 504 and the saturation suppression processing 505 on a pixel basis. Specifically, the image processing unit 402 performs the achromatic color determination processing 504 on a pixel determined to be an edge pixel, and then, when the pixel is determined to be achromatic, performs the saturation suppression processing 505. Then, the image processing unit 402 proceeds to the following pixel.

Then, the image processing unit 402 performs the color conversion processing 506 on the image data having undergone the saturation suppression processing 504 to convert the RGB image data into cyan, magenta, yellow, and key black (CMYK) image data. In the color conversion processing 506, the edge quality can be improved by using different conversion methods between a pixel determined to be an edge pixel and other pixels.

For example, when converting the RGB image data of a pixel determined to be an edge pixel having the equal RGB signal values (R=G=B) into CMYK image data, the CMYK image data is represented by image data having only the density of the K plane. Alternatively, after converting the RGB image data into CMY image data, the CMY three-color density is converted into the density of the K plane (hereinafter referred to as K density), for example, through Under Color Removal (UCR) processing. Specifically, the color conversion processing 506 converts the density of an edge pixel so that the K density becomes higher than the density of any other process colors. Naturally, the image processing unit 402 may determine whether a pixel is achromatic referring to the achromatic color signal.

Thus, since an achromatic edge pixel is K-monochromatized and represented only by the K plane, the relevant pixel is not subjected to influences of a plane deviation of the C, M, and Y planes (hereinafter referred to as CMY planes), making it possible to print sharp edges without color misregistration. On the other hand, the inside of a black character not determined to be an edge pixel and a photographic portion not determined to be achromatic are represented by the CMY three process colors, and therefore can be printed with rich colors.

Then, the image processing unit 402 performs filter processing 507 on the image data having undergone the color conversion processing 506 to perform edge stressing and smoothing processing. The filter processing 507 performs edge stressing processing on a pixel determined to be an edge pixel, and performs smoothing processing on other pixels. Thus, photographic portions can be smoothed while character edges become sharp, which improves readability. With a pixel having undergone the edge stressing processing, the luminance decreases. Although, in the above-described example, the filter processing 507 is performed on the CMYK image, the filter processing 507 may be performed on the RGB image before performing the color conversion processing 506.

Then, the image processing unit 402 performs trapping processing 508 on the image data having undergone the filter processing 507. In this case, based on the setting values managed by the setting values management unit 403, the image processing unit 402 performs the trapping processing 508 in which, at the boundary between two adjacent objects, one color plane object is enlarged by the trapping width toward the other color plane object. Through the trapping processing 508, at the boundary between two adjacent objects not having any common color plane, one color plane object can overlap with the other color plane object. As a result, a white spot can be prevented from arising. In the trapping processing 508 according to the present exemplary embodiment, since the K plane has low luminance and its image quality can be significantly influenced by the enlargement, the K plane is not enlarged in the trapping processing 508. In other words, the trapping processing 508 for enlarging the K plane (a predetermined color plane) is not performed.

For example, suppose a case where an object C composed of the C plane and an object K composed of the K plane adjacently exist. When the trapping width is 3 pixels, the C plane of the object C is enlarged toward the object K by 3 pixels across the boundary between the objects C and K. In other words, when the C and K objects adjacently exist without white pixels therebetween and there is a pixel of a color plane of the object C at a position separated by 3 pixels (trapping width), the pixel value of the color plane of a certain pixel of the object K is replaced with the pixel value of the color plane of the pixel of the object C. The trapping processing 508 according to the present exemplary embodiment will be described in detail below.

Then, the image processing unit 402 performs the thickening processing 509 on the image data having undergone the trapping processing 508. The width of a line and a character can be thickened or thinned based on the setting values managed by the setting values management unit 403. Depending on the setting values managed by the setting values management unit 403, the image processing unit 402 performs the following gamma processing 510 on the image data having undergone the trapping processing 508 as it is, without performing the thickening processing 509 (through processing). The thickening processing 509 will be described in detail below.

Then, the image processing unit 402 performs the gamma processing 510 on the image data having undergone the thickening processing 509 to convert the image data into image data generated in consideration of the density characteristics of the print process by the printer 220.

Then, the image processing unit 402 performs dither processing 511 on the image data having undergone the gamma processing 510 to screen the image data, and transmits the processed image data to the image output unit 404.

<Relation Between Thickness of Edge Extraction and Image Quality>

The relation between the edge width extracted in the above-described edge extraction processing 503 and the image quality will be described below with reference to an achromatic character and a chromatic character.

[Achromatic Character]

Figure 7A:
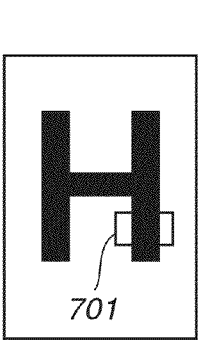
FIGS. 7A to 7F illustrate effects of character edge processing through enlargement of a character portion.
Figure 7B:
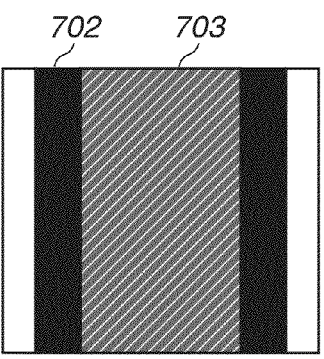
Figure 7C:
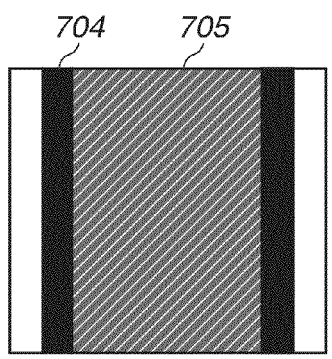

The image processing unit 402 performs image processing (from the MTF processing 501 to the filter processing 507) on image data of an achromatic character (black character) "H" which shows the luminance smaller than a predetermined threshold value. The image data having undergone the relevant image processing is illustrated in FIG. 7A. When the edge extraction processing 503 uses a first threshold value to thickly extract edges, the portion of a rectangle 701 illustrated in FIG. 7A corresponds to image data as illustrated in FIG. 7B. On the other hand, when the edge extraction processing 503 uses a second threshold value (a threshold value larger than the first threshold value) to thinly extract edges, the portion of the rectangle 701 illustrated in FIG. 7A corresponds to image data as illustrated in FIG. 7C, as a result of the image processing.

Edge portions 702 and 704 extracted by the edge extraction processing 503 corresponds to image data composed only of the K plane (K-monochromatized). The image data has undergone image processing for edge portion from the saturation suppression processing 505 to the filter processing 507. On the other hand, non-edge portions 703 and 705 other than edge portions corresponds to image data composed mainly of the CMY planes. The image data has undergone image processing for non-edge portion in the saturation suppression processing 505 and the filter processing 507.

[Chromatic Character]

Figure 7D:
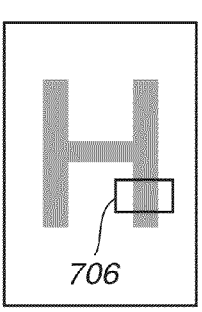
Figure 7E:
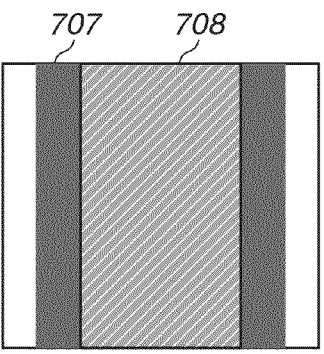

On the other hand, the image processing (from the MTF processing 501 to the filter processing 507) is performed on image data of a chromatic character (color character) "H". The image data having undergone the image processing is illustrated in FIG. 7D. When the edge extraction processing 503 uses the first threshold value to thickly extract edges, the portion of a rectangle 706 illustrated in FIG. 7D corresponds to image data as illustrated in FIG. 7E. On the other hand, when the edge extraction processing 503 uses the second threshold value (a threshold value smaller than the first threshold value) to thinly extract edges, the portion of the rectangle 706 illustrated in FIG. 7D corresponds to image data as illustrated in FIG. 7F, as a result of the image processing.

[Difference Between Achromatic Character and Chromatic Character]

In the case of the image data of the black character illustrated in FIG. 7A to 7C, the luminance of the original image data is low. Therefore, the luminances of the edge portions 702 and 704 having undergone the image processing for edge portion are almost equally perceived by the human eye as the luminances of the edge portions 703 and 705 having undergone the image processing for non-edge portion. More specifically, even after the image processing for edge portion has been performed on the black character, the black character is not perceived as unnaturally edged because of lowered luminance. Therefore, it can be said that an extracted edge width has small influences on the black character.

Figure 7F:
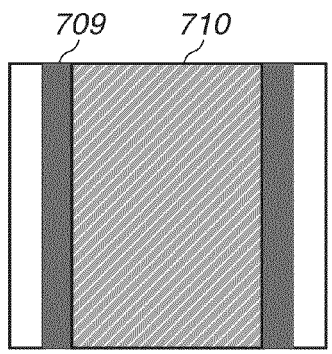

However, in the case of the image data of a color character illustrated in FIGS. 7D to 7F, the original image data is chromatic, and therefore the luminances of edge portions 707 and 709 having undergone the image processing for edge portion are remarkably low. On the other hand, the luminances of non-edge portions 708 and 710 having undergone the image processing for non-edge portion remain comparatively high, and therefore luminance differences from the edge portions 707 and 709 will be perceived by the human eye. In other words, after the image processing for edge portion has been performed on the color character, the color character will be perceived as unnaturally edged because of lowered luminance. The larger an extracted edge width, the easier it becomes to recognize this edge.

Therefore, to make the unnatural edges of the color character inconspicuous, it is desirable to thin the edge width extracted in the edge extraction processing 503.

<Thin Edge Width>

As described above, a thin edge width is desirable. A case where the edge width extracted in the edge extraction processing 503 is thinned will be described below with reference to printed images illustrated in FIGS. 8A to 8F. FIGS. 8A to 8F correspond to the image data illustrated in FIG. 7C.

Figure 8A:
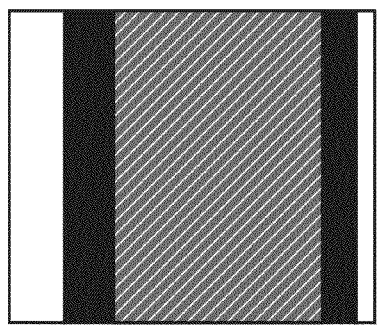
FIGS. 8A to 8F illustrate influences of color misregistration and effects of correction through enlargement of a character portion.

FIG. 8A illustrates a printed image data having a thin edge width (FIG. 7C) in a case where no plane deviation arises in the print process. An example illustrated in FIG. 8A will be described below on the premise that neither the trapping processing 508 nor the thickening processing 509 has been performed. Since no plane deviation arises, a white spot does not occur.

Figure 8B:
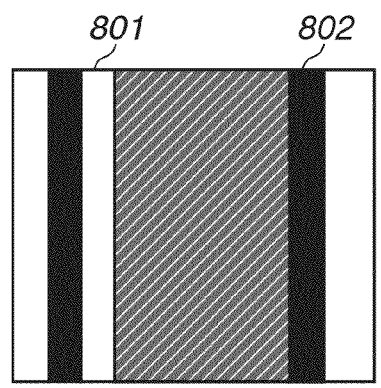

FIG. 8B illustrates the printed image data having a thin edge width (FIG. 7C) in a case where a small amount of plane deviation arises in the print process. An example illustrated in FIG. 8B will be described below on the premise that neither the trapping processing 508 nor the thickening processing 509 has been performed. With this plane deviation, the K plane constituting the edge portion 704 shifts to the left in the main scanning direction (horizontal direction on the drawing). As a result, a right-hand edge portion 802 of the K plane overlaps with the non-edge portion 705. A white spot 801 arises between the left-hand edge portion 704 and the non-edge portion 705 in the printed image.

Figure 8C:
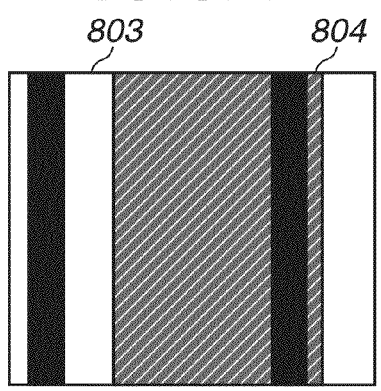

FIG. 8C illustrates a printed image for the image data having a thin edge width (FIG. 7C) in a case where a plane deviation larger than the one illustrated in FIG. 8B arises in the print process. The example illustrated in FIG. 8C will be described below on the premise that neither the trapping processing 508 nor the thickening processing 509 has been performed. With this plane deviation, the K plane constituting the edge portion 704 largely shifts to the left in the main scanning direction (horizontal direction on the drawing). As a result, the CMY planes constituting the non-edge portion 705 protrude from the right-hand edge portion of the K plane, and color bleeding 804 arises. Further, a white spot 803 having a large width arises between the left-hand edge portion 704 and the non-edge portion 705 in the printed image.

Figure 8D:
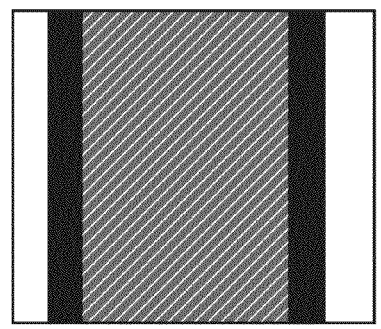

FIG. 8D illustrates a printed image for the image data having a thin edge width (FIG. 7C) having undergone the trapping processing 508. In the printed image, the K plane is shifted due to a plane deviation similar to that illustrated in FIG. 8B. The CMY planes of the non-edge portion 705 are enlarged toward the edge portion 704 by the trapping processing 508. As a result, while a small plane deviation arises, the white spot 801 does not arise.

Figure 8E:
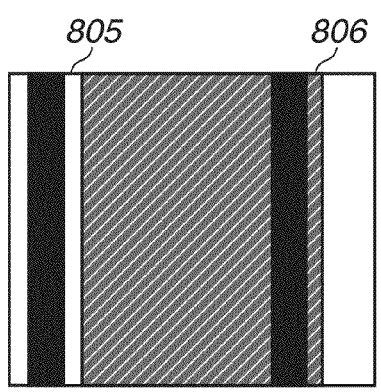

FIG. 8E illustrates a printed image for the image data having undergone trapping processing 508 similar to that illustrated in FIG. 8D. In the printed image, the K plane is largely shifted due to a plane deviation similar to that illustrated in FIG. 8C. Although the CMY planes of the non-edge portion 705 are enlarged toward the edge portion 704 by the trapping processing 508, a white spot 805 arises between the edge portion 704 and the non-edge portion 705 because of a large amount of plane deviation. Further, because of a large amount of plane deviation, as illustrated in FIG. 8C, color bleeding 806 of the CMY planes constituting the non-edge portion 705 still arises from the right-hand edge portion of the K plane. Specifically, in the case of a large amount of plane deviation, the white spot 805 and the color bleeding 806 cannot be prevented even after performing trapping processing 508 similar to that in the case of a small amount of plane deviation.

The trapping processing 508 is to overlap adjacent objects with each other. Therefore, the trapping processing 508 cannot enlarge one object exceeding the other object adjacent to it. Therefore, even if the user sets a large trapping width because of a large amount of plane deviation, the non-edge portion 705 is not enlarged to the left exceeding the edge portion 704. As a result, if a plane deviation of the thin edge width of the edge portion 704 or larger arises, the white spot 805 will also arise.

Therefore, as described above with reference to FIGS. 8A to 8F, when a thin edge is extracted in the edge extraction processing 503, the plane deviation occurs in a large amount, it is difficult to prevent a white spot and color bleeding from arising simply by performing the trapping processing 508. Accordingly, a white spot and color bleeding are suppressed by performing the thickening processing 509 in addition to (in combination with) the trapping processing 508.

<Combining Trapping Processing and Thickening Processing>

Combining the trapping processing 508 and the thickening processing 509 will be described below with reference to FIG. 9A. The flowchart illustrated in FIG. 9A is implemented by the image processing unit 402 when the CPU 211 executes a control program stored in the ROM 212.

In step 1c-1, the image processing unit 402 determines whether the amount of plane deviation is larger than a predetermined threshold value. Here, the amount of plane deviation may be an amount acquired by checking a print product, which is then notified, as a trapping width setting value, to the control unit 210 via the operation unit 219 by the user. In other words, in step 1c-1, the image processing unit 402 determines whether the trapping width set by the user is larger than a predetermined threshold value. The amount of plane deviation may be the one detected by a sensor (not illustrated) included in the image forming apparatus 101. When the amount of plane deviation is determined to be larger than the threshold value (YES in step 1c-1), the processing proceeds to step 2c-1. On the other hand, when the amount of plane deviation is determined to be not larger than the threshold value (NO in step 1c-1), the processing proceeds to step 3c-1.

In step 2c-1, the image processing unit 402 performs the trapping processing 508 based on the set trapping width. The trapping processing 508 will be described below. Then, the processing proceeds to step 4c-1.

In step 4c-1, the image processing unit 402 performs the thickening processing 509 based on the set trapping width. The thickening processing 509 will be described below. Then, the processing exits this flowchart.

In step 3c-1, the image processing unit 402 performs the trapping processing 508 based on the set trapping width. The trapping processing 508 in this step is the same as the processing performed in step 2c-1. Then, the processing exits this flowchart.

As described above with reference to this flowchart, the image processing unit 402 determines whether or not the thickening processing 509 is to be performed after the trapping processing 508 is performed, based on the amount of plane deviation.

<Trapping Processing>

The trapping processing 508 will be described below. Hereinafter an edge refers to an edge extracted by the edge extraction processing 503. A target pixel refers to a pixel of the color (pixel value) which is replaced by the trapping processing 508 and the thickening processing 509. Reference pixels refer to pixels in an area (reference area) centering on the target pixel (for example, 8 or 15 pixels in the vicinity of the target pixel). The size of the reference area varies depending on the trapping width. For example, when the trapping width is an N-pixel width, the reference area is an area formed of (2N+1)×(2N+1) pixels.

The trapping processing 508 in steps 2c-1 and 3c-1 illustrated in FIG. 9A will be described below with reference to the flowchart FIG. 10. In the trapping processing 508 according to the present exemplary embodiment, the K plane is set as a predetermined color plane not to be enlarged. This setting aims to prevent a large change in appearance caused by the enlargement of the K plane which generally has a low luminance and is conspicuous.

In this case, since the image processing unit 402 performs the trapping processing 508 to prevent the above-described white spot, in the trapping processing 508, for example, pixel values of the CMY color planes are added to K-monochromatized edge pixels. This processing enlarges the non-edge portion of the CMY color planes toward the edge portion of the K color plane based on the trapping width.

In step 1*a*, the image processing unit 402 determines whether the target pixel belongs to the edge portion. When the target pixel belongs to the edge portion (YES in step 1*a*), the processing proceeds to step 2*a*. On the other hand, when the target pixel does not belong to the edge portion (NO in step 1*a*), the processing exits this flowchart.

In step 2*a*, the image processing unit 402 determines the density of the target pixel. Specifically, with respect to the target pixel, when the density of each of the C, M, and Y planes is a predetermined density T0 or lower and the K density is a predetermined density T1 or higher (YES in step 2*a*), the processing proceeds to step 3*a*. On the other hand, when the density does not fall within the above condition (NO in step 2*a*), the processing exits this flowchart.

In step 2*a*, the image processing unit 402 determines whether the target pixel is almost a K-monochrome pixel (for example, a K-monochromatized pixel). Therefore, the image processing unit 402 sets the predetermined density T0 to a small value such as 10 while the density ranges from 0 to 255 and determines that the density of the CMY planes (hereinafter referred to as CMY density) is almost zero. The image processing unit 402 also sets the predetermined density T1 to a value such as 125, to determine whether the K plane is monochrome having a predetermined density or higher.

In step 3*a*, the image processing unit 402 determines whether each reference pixel belongs to the non-edge portion. When any reference pixel belongs to the non-edge portion (YES in step 3*a*) among all reference pixels, the processing proceeds to step 4*a*. On the other hand, when all reference pixels belong to the edge portion (NO in step 3*a*), the processing exits this flowchart.

In step 4*a*, the image processing unit 402 determines the density of each reference pixel determined as belonging to the non-edge portion in step 3*a*. Specifically, with respect to reference pixels determined as belonging to the non-edge portion, when the density of any one of the C, M, and Y planes is determined to be a predetermined density T2 or higher and the K density is determined to be a predetermined density T3 or lower (YES in step 4*a*), the processing proceeds to step 5*a*. On the other hand, when the density does not fall within the above condition (NO in step 4*a*), the processing exits this flowchart.

In step 4*a*, the image processing unit 402 determines whether the reference pixel is a pixel having a low K density (for example, a pixel not K-monochromatized). Therefore, the image processing unit 402 sets T2 to a value such as 100, while the density ranges from 0 to 255 and determines that the C, M, or Y plane has a predetermined density or higher. The image processing unit 402 also sets the predetermined density T3 to a value such as 50, to determine that the K density is low.

In step 5*a*, the image processing unit 402 adds to the target pixel the CMY density of the reference pixel having a low K density and a predetermined CMY density or higher determined in step 4*a*. By this addition the CMY density of the target pixel is replaced with the CMY density of the reference pixel. In step 4*a*, when a plurality of pixels is detected, the average values of these pixels or the maximum pixel value may be applied. Further, before adding the density of the reference pixel to the target pixel, the density of the reference pixel may be multiplied by the trapping density set in FIG. 3B. The trapping density from 0 to 100% can be specified.

This completes descriptions of the trapping processing 508.

<Thickening Processing>

The thickening processing 509 in step 4*c*-1 illustrated in FIG. 9A will be described below with reference to the flowchart illustrated in FIG. 11.

In thickening processing 509, for example, the image processing unit 402 performs enlargement (thickening) of the CMY color planes to prevent the above-described white spot 805 and the color bleeding 806. Referring to FIG. 7C, it is necessary that a color plane to be enlarged is a pixel belonging to the edge portion and having a predetermined K density or higher. Therefore, in the examples illustrated in FIGS. 8A to 8F, it is prerequisite that the target pixel subject to color addition belongs to the non-edge portion and has a low K density, and that the reference pixel having a color to be added belongs to the edge portion and is K-monochromatized. In the present exemplary embodiment, the edge portion of the K plane is enlarged in the direction opposite to the trapping direction. In the thickening processing 509 according to the present exemplary embodiment, the reference area (including a target pixel and reference pixels) is the same area as the one used in the trapping processing 508.

In step 1*b*, the image processing unit 402 determines whether the target pixel belongs to the edge portion. When the target pixel belongs to the non-edge portion (YES in step 1*b*), the processing proceeds to step 2*b*. On the other hand, when the target pixel belongs to the edge portion (NO in step 1*b*), the processing exits this flowchart.

In step 2*b*, the image processing unit 402 determines the density of the target pixel. With respect to the target pixel, when the density of any one of the C, M, and Y planes is a predetermined density T4 or higher and the K density is a predetermined density T5 or lower (YES in step 2*b*), the processing proceeds to step 3*b*. On the other hand, when the density does not fall within the above condition (NO in step 2*b*), the processing exits this flowchart.

Referring to FIG. 8E, the portion where the white spot 805 arises is a portion having a predetermined CMY density or higher before a plane deviation arises. Further, the portion where the color bleeding 806 arises is a portion to the right of the right-hand edge portion illustrated in FIG. 8E after a plane deviation arises. The relevant portion is a colorless portion (an achromatic (almost white) portion where the density of each of the C, M, and Y planes is almost zero). In the present exemplary embodiment, therefore, the image processing unit 402 sets T4 to 0 to prevent both a white spot and color bleeding by enlarging K plane. Since it is prerequisite that the target pixel has a low K density to enlarge the K plane, the image processing unit 402 sets T5 to a value of 50 or below, for example, while the density ranges from 0 to 255. In the present exemplary embodiment, by setting T4 and T5 to such values, the target pixel having a low K density is subjected to the thickening processing 509 regardless of the CMY density.

In step 3*b*, the image processing unit 402 determines whether each reference pixel belongs to the edge portion. When any of reference pixels belongs to the edge portion (YES in step 3*b*), the processing proceeds to step 4*b*. On the other hand, when none of reference pixels belongs to the edge portion (NO in step 3*b*), the processing exits this flowchart.

In step 4*b*, the image processing unit 402 determines whether the reference pixel is a pixel having a high K density. Specifically, among reference pixels determined as belonging the edge portion in step 3b, when the density of each of the C, M, and Y planes is a predetermined density T6 or lower and the K density is a predetermined density T7 or higher (YES in step 4b), the processing proceeds to step 5b. On the other hand, when the density does not fall within the above condition (NO in step 4b), the processing exits this flowchart.

The image processing unit 402 searches for a reference pixel determined as belonging to the edge portion and having a high K density (for example, a K-monochromatized pixel) out of the reference pixels. In the present exemplary embodiment, since the trapping processing 508 is performed before this processing, there exists a pixel having both a high K density and a high CMY density in the edge portion. Accordingly, to determine a pixel having a high K density regardless of the CMY density of the reference pixel, the image processing unit 402 sets T6 to a value, such as 255 while the density ranges from 0 to 255. Since it is required that the K density is a predetermined density or higher, the image processing unit 402 sets T7 to a value of 125, for example.

In step 5b, the image processing unit 402 adds to the target pixel the K density of the reference pixel determined as belonging to the edge portion and having a high density (to be K-monochrome) in step 4b.

In step 6b, the image processing unit 402 corrects the non-edge signal of the target pixel to change to the edge signal.

Specifically, in steps 1b to 4b, the image processing unit 402 determines whether the target pixel adjacent to the reference pixel determined as belonging to the edge portion and to be achromatic (K-monochrome) belongs to the non-edge portion and has the low density achromatic color plane (K plane). In steps 5b to 6b, the image processing unit 402 recognizes such a target pixel as an edge, and increases the density of the achromatic color plane (K plane) of the target pixel. This completes descriptions of the thickening processing 509.

Although, in the above-described descriptions, the CMY density threshold values T2, T4, and T6 are commonly used for the C, M, and Y planes in a simplified way, different threshold values may be used for each of the C, M, and Y planes.

When a plane deviation as illustrated in FIG. 8B is small, since the image processing unit 402 performs the trapping processing 508 without performing the thickening processing 509, the image processing unit 402 can perform correction as illustrated in FIG. 8D. Specifically, since the edge width after image processing is small, unnatural edging can be suppressed.

Figure 8F:
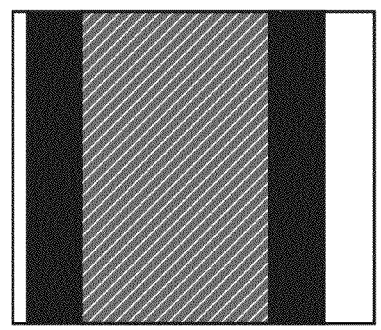

When a plane deviation is large as illustrated in FIG. 8C, the image processing unit 402 can perform correction as illustrated in FIG. 8F by combining the trapping processing 508 and the thickening processing 509. Specifically, a white spot and color bleeding which cannot be suppressed only by the trapping processing 508 can be suppressed by the thickening processing 509. When a plane deviation is large, the edge portion formed on the K plane is thickened and accordingly the edge width increases. However, since the luminance of a black character is low, even when low-luminance edges of a black character are thickened, visual influences of edging is smaller than a case where low-luminance edges of a color character are thickened, and image quality does not degrade.

In a second exemplary embodiment, the trapping processing 508 and the thickening processing 509 are performed based on the setting values for the trapping by the user. In the present exemplary embodiment, only elements different from those in the first exemplary embodiment will be described below, and, unless otherwise noted, similar configurations to those in the first exemplary embodiment are employed.

The trapping processing 508 and the thickening processing 509 based on setting values set by the user via a user interface (UI) screen of the operation unit 219 will be described below.

A first example will be described below. In the case of a plane deviation as illustrated in FIG. 8B, the user gives instructions to perform the trapping processing 508 via a UI screen for setting the trapping processing 508 displayed on the operation unit 219. FIG. 3 illustrates a UI screen for setting the trapping processing 508, which receives an instruction from the user. The UI screen for receiving an instruction is not limited to the one displayed on the operation unit 219, and may be displayed on the information processing apparatus 102. Setting values for the trapping processing 508 set by the user via the UI screen are managed by the setting values management unit 403.

Figure 3A:
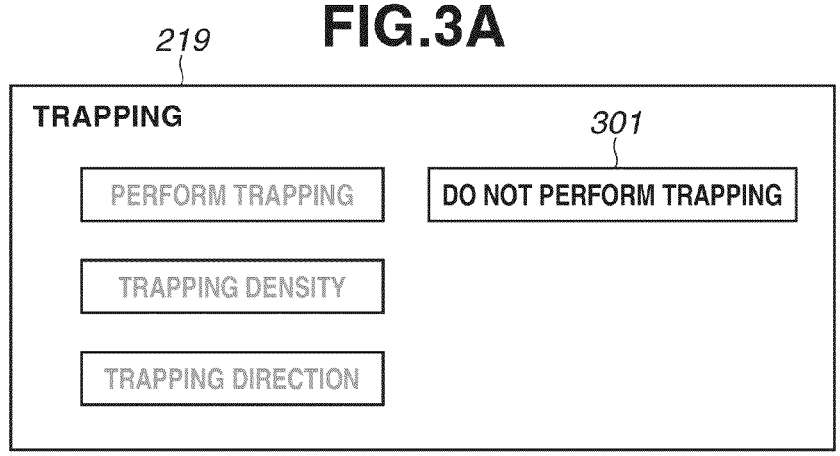
FIGS. 3A, 3B, and 3C illustrate user interfaces (UIs) indicating trapping settings.

FIG. 3A illustrates a state where the "DO NOT PERFORM TRAPPING" button is pressed. The trapping processing 508 is not performed in this state. In this case, when the user presses the "PERFORM TRAPPING" button, the gray-out is cancelled and the "TRAPPING DENSITY" and the "TRAPPING DIRECTION" buttons are enabled allowing the user to press each button.

Figure 3B:
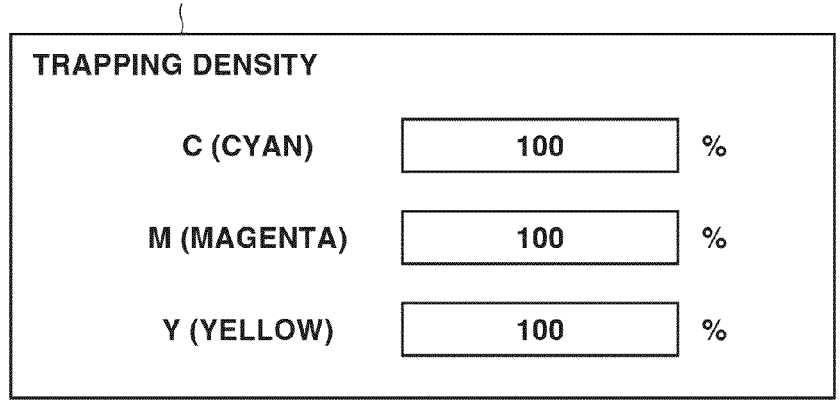

When the user presses the "TRAPPING DENSITY" button, a UI screen 219 illustrated in FIG. 3B is displayed. In the UI screen 219, the user can specify the density for each of the "C", "M", and "Y" color planes. In this case, the user can specify the trapping density with a numerical value from 0 to 100%. For example, when the 100% trapping density is specified, 100% of an adjacent different color plane is added to pixels at the boundary between different color planes. When the 0% trapping density is specified, the color plane is not enlarged.

Figure 3C:
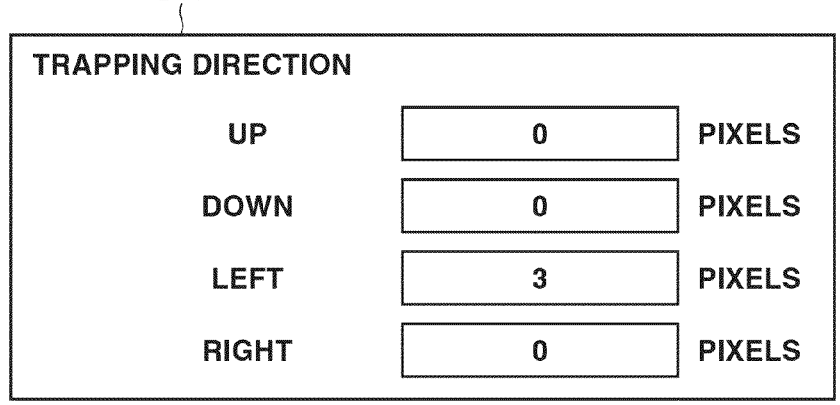

When the user presses the "TRAPPING DIRECTION" button, the UI screen 219 illustrated in FIG. 3C is displayed. In the UI screen 219, the user can specify the trapping direction ("UP", "DOWN", "LEFT", or "RIGHT"). Further, the trapping width can be specified in each of the four trapping directions. Specifically, the trapping width is set in association with each trapping direction.

In this example, the user specifies the 100% trapping density for each of the C, M, and Y planes, and specifies one pixel in the left trapping direction. When the settings values are specified in this way, the color plane of the non-edge portion 705 can be enlarged by 1 pixel toward the edge portion 704 which is adjacent to the left of the non-edge portion 705, thus preventing a white spot illustrated in FIG. 8D.

A second example will be described below. In the case of a plane deviation as illustrated in FIG. 8C, the user sets the trapping processing similar to the first example. In this example, the width of the plane deviation is larger than that in the first example. Therefore, the user specifies the 100% trapping density for each of the C, M, and Y planes, and specifies 3 pixels in the left trapping direction. However, when an edge width of 2 pixels is extracted in the edge extraction processing 503, trapping processing for the specified trapping width (3 pixels) cannot be performed since object enlargement (trapping processing) is possible only by the edge width. As a result, the white spot 805 arises, as illustrated in FIG. 8E.

Accordingly, in the present exemplary embodiment, the image processing unit 402 performs the trapping processing by the specified trapping width and then thickens the edge portion of the K plane by 1 pixel to the right in the main scanning direction. This processing enables correcting of the image, as illustrated in FIG. 8F.

The above-described first and second examples will be described below with reference to the flowchart illustrated in FIG. 9B. This flowchart replaces the flowchart illustrated in FIG. 9A at the time of execution. The flowchart illustrated in FIG. 9B is implemented when the CPU 211 executes a control program stored in the ROM 212, and is executed by the image processing unit 402.

In step 1c-2, the image processing unit 402 acquires setting values for the trapping processing from the setting values management unit 403. Setting values include the trapping density, the trapping direction, and the trapping width.

In step 2c-2, the image processing unit 402 acquires the edge width extracted in the edge extraction processing 503, and determines whether the trapping width is larger than the acquired edge width. When the trapping width is larger than the edge width (YES in step 2c-2), the processing proceeds to step 3c-2. On the other hand, when the trapping width is not larger than the edge width (NO in step 2c-2), the processing proceeds to step 8c-2. In this case, instead of the edge width, the user may use a value determined based on the edge width extracted in the edge extraction processing 503. The edge width may be a value obtained directly from the edge extracted in the edge extraction processing 503 or from the threshold value used by the edge extraction processing 503. Further, the edge width may be a value obtained by the image processing unit 402 after this flowchart is started and pre-stored in the setting values management unit 403, or may be a predetermined value stored in the setting values management unit 403.

In step 3c-2, the image processing unit 402 generates a reference area based on the setting values and the edge width acquired in step 1c-2. A method for generating a reference area will be described below. Then, the processing proceeds to step 4c-2.

In step 4c-2, the image processing unit 402 performs the trapping processing 508 by using the reference area generated in step 3c-2. A detailed method is similar to that described in the first exemplary embodiment except for the reference area. Then, the processing proceeds to step 5c-2.

In step 5c-2, the image processing unit 402 calculates the thickening width. For example, the thickening width is obtained by subtracting the edge width from the trapping width. Then, the processing proceeds to step 6c-2.

In step 6c-2, the image processing unit 402 generates a reference area to be used for the thickening processing 509 based on the thickening width calculated in step 5c-2. The reference area will be described in detail below. Then, the processing proceeds to step 7c-2.

In step 7c-2, the image processing unit 402 performs the thickening processing 509 by using the reference area generated in step 6c-2. A detailed method is similar to that described in the first exemplary embodiment except for the reference area. Then, the processing exits this flowchart.

In step 8c-2, the image processing unit 402 generates a reference area based on the setting values acquired in step 1c-2. The reference area will be described in detail below. Then, the processing proceeds to step 9c-2.

In step 9c-2, the image processing unit 402 performs the trapping processing 508 based on the reference area generated in step 9c-2. A detailed method is similar to that described in the first exemplary embodiment except for the reference area.

<Generating a Reference Area>

A method for generating a reference area to be used in the trapping processing 508 in steps 3c-2 and 8c-2 will be described below with reference to the flowchart illustrated in FIG. 14A.

In step 1d, the image processing unit 402 acquires the specified trapping density, and determines whether the trapping density setting value of any one of the C, M, and Y planes is larger than 0%. When the trapping density setting value of any one of the C, M, and Y planes is larger than 0% (YES in step 1d), the processing proceeds to step 2d. On the other hand, when the trapping density does not fall within the above condition (NO in step 1d), the processing exits this flowchart. A state where the trapping density setting value of any one of the C, M, and Y planes is 0% indicates that addition of pixels of any one color plane is not performed.

In step 2d, the image processing unit 402 acquires the specified trapping direction and the specified trapping width in each trapping direction, and determines whether the trapping width in each of all trapping directions is 0 pixel. When the trapping width in each of all trapping directions is 0 pixel (YES in step 2d), the processing exits this flowchart. On the other hand, when the trapping density does not fall within the above condition (NO in step 2d), the processing proceeds to step 3d. A state that the trapping width in each of all trapping directions is 0 pixel indicates that object enlargement is not performed in any direction.

In step 3d, the image processing unit 402 generates a reference area based on the trapping direction and the trapping width. The image processing unit 402 generates a reference area having a trapping width larger than 0 pixel so that reference pixels are provided in the direction opposite to the trapping direction. For example, when 0, 0, 3, and 0 pixels are specified for the up, down, left, and right trapping directions, respectively, a trapping width larger than 0 pixel is provided only in the left trapping direction. In this case, therefore, a reference area is generated as an area having 3 reference pixels to the right of the target pixel. When this reference area includes the target pixel, the reference area is like an area 902 illustrated in FIG. 12A. When a reference area is not generated, object enlargement is not performed by the trapping processing 508.

A reference area is generated in this way.

Figure 12A:
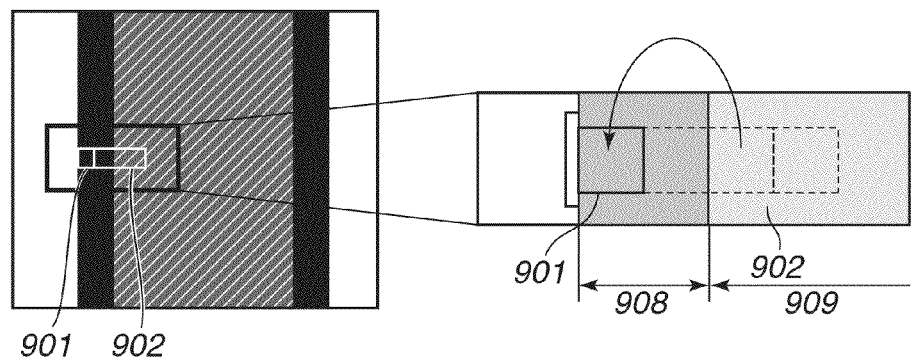
FIGS. 12A, 12B, and 12C illustrate influences of color misregistration and effects of correction through enlargement of a character portion.

The generation of a reference area will be additionally described below with reference to FIG. 12A. The left-hand drawing in FIG. 12A illustrates a state where the trapping processing 508 for adding a pixel to a target pixel 901 by using the reference area 902 is performed on the image data illustrated in FIG. 7C. The right-hand drawing in FIG. 12A is an enlarged view illustrating the reference area illustrated in the left-hand drawing in FIG. 12A.

For example, to correct a white spot produced by the K plane having shifted to the left in the main scanning direction, it is specified that trapping processing 508 in the left direction is performed on the CMY color planes. In the TRAPPING DENSITY settings illustrated in FIG. 3B, "C (CYAN) 100%", "M (MAGENTA) 100%", and "Y (YELLOW) 100%" are specified. In the TRAPPING DIRECTION settings illustrated in FIG. 3C, "UP 0 PIXEL", "DOWN 0 PIXEL", "LEFT 3 PIXELS", and "RIGHT 0 PIXEL" are specified. In this case, the reference area 902 including the target pixel 901 illustrated in the right-hand drawing in FIG. 12A is a 1×(trapping width+1) pixel area (i.e., a 1×4 pixel area), and has such a shape that pixels on the right side of the target pixel can be referred to.

The extracted edge is an area 908 having a 2-pixel width, and a non-edge portion is an area 909. Therefore, the image processing unit 402 performs the trapping processing 508 on the target pixel 901 belonging to the edge portion, by adding the pixel values of the reference pixels (non-edge portion) in the reference area 902 to the target pixel 901. Therefore, the image processing unit 402 generates an area having reference pixels for the trapping width in the direction opposite to the trapping direction specified by the user. Since the image processing unit 402 performs the trapping processing 508 by using the reference area generated based on such a trapping direction and trapping width, the non-edge portion of the CMY planes can be enlarged by the trapping width in the trapping direction.

Figure 12B:
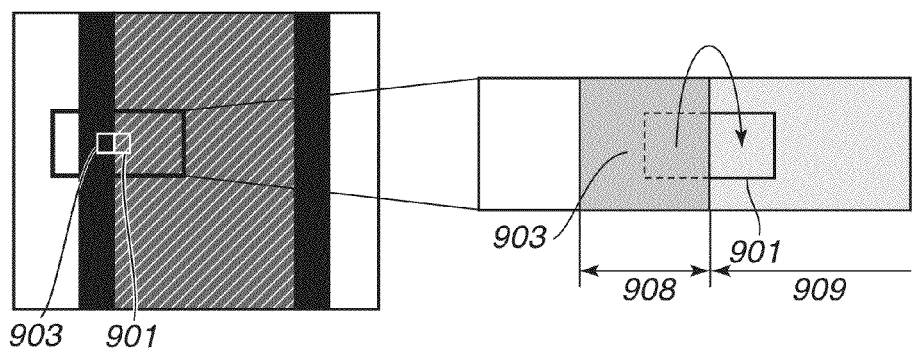

Likewise, a method for generating a reference area in the thickening processing 509 in step 6c-2 will be described below with reference to the flowcharts illustrated in FIGS. 12B and 14B. The left-hand drawing in FIG. 12B illustrates a state where the thickening processing 509 for adding a pixel to the target pixel 901 by using a reference area 903 is performed on the image data illustrated in the left-hand drawing in FIG. 12A having undergone the trapping processing 508. The right-hand drawing in FIG. 12B is an enlarged view illustrating the reference area illustrated in the left-hand drawing in FIG. 12B.

Figure 14B:
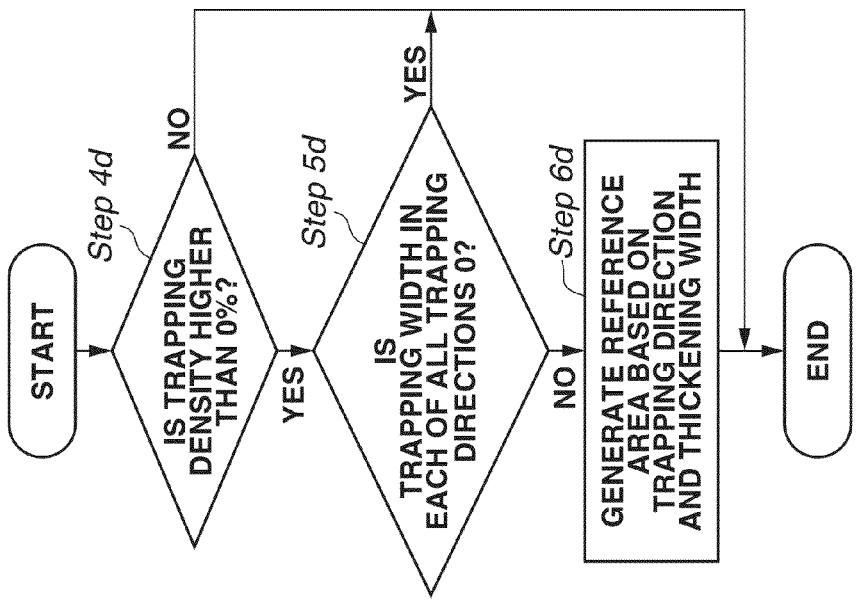
FIGS. 14A and 14B are flowcharts illustrating processing for generating a reference area in trapping processing and thickening processing.
Figure 14A:
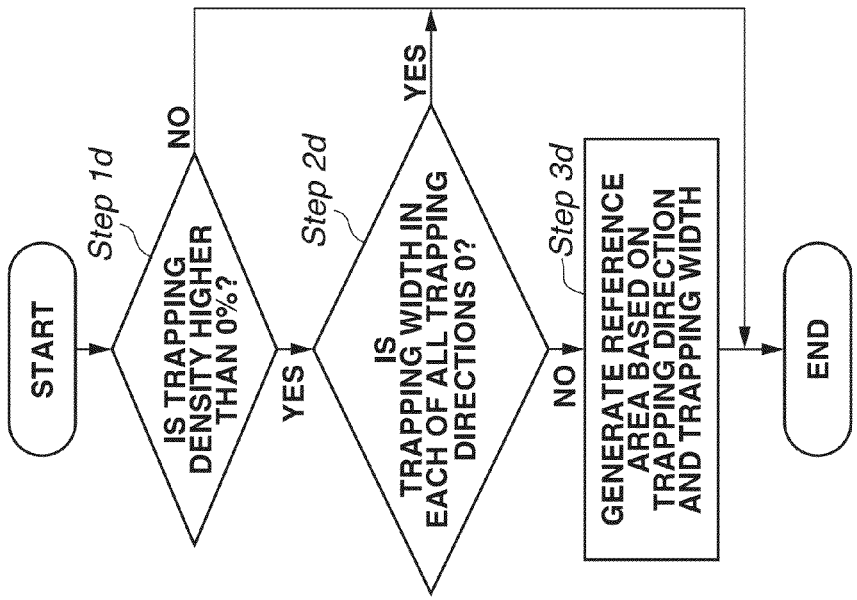

Steps 4d and 5d illustrated in FIG. 14B are similar to steps 1d and 2d illustrated in FIG. 14A, respectively.

In step 6d, the image processing unit 402 generates a reference area based on the trapping direction and the thickening width. When a thickening width larger than 0 pixel is calculated, the image processing unit 402 generates a reference area so that reference pixels are provided in the same direction as the corresponding trapping direction. Specifically, when the thickening width is 1 pixel and the trapping direction corresponding to it is the left direction, the reference area 903 including the target pixel 901 illustrated in the right-hand drawing in FIG. 12B is a 1×(thickening width+1) pixel area (i.e., a 1×2 pixel area in this case). This area includes a pixel to the left of the target pixel 901 as a reference pixel. Since the image processing unit 402 performs the thickening processing 509 in this way by using the reference area generated based on the trapping direction and the thickening width, the edge portion of the K plane can be enlarged by the thickening width in the direction opposite to the trapping direction. Thus, a reference area is generated.

With the above-described processing, when the user specifies the trapping width via the UI screen, the image processing unit 402 can determine whether only the trapping processing 508 is to be performed or the thickening processing 509 is to be performed together with the trapping processing 508, based on the edge width. Further, the image processing unit 402 can determine the trapping direction and the thickening direction based on the trapping direction specified by the user.

In a third exemplary embodiment, a method for improving the character quality more than in the above-described exemplary embodiments will be described below. Also in the present exemplary embodiment, redundant descriptions will be omitted.

In the first and the second exemplary embodiments, in the case where plane deviation is large, the image processing unit 402 performs the trapping processing 508, and then thickens a character edge to correct a white spot and color bleeding. As a result, the character width becomes thicker than before the correction. Although the present exemplary embodiment performs the thickening processing similar to the first and the second exemplary embodiments to cope with a white spot, the present exemplary embodiment uses a different method from the first and the second exemplary embodiments to cope with color bleeding. This enables the image processing unit 402 to perform the trapping processing 508 and the thickening processing 509 with the same character width as that before the correction, thus a white spot and color bleeding can be prevented.

The above-described processing will be described below with reference to the accompanying drawings.

Figure 12C:
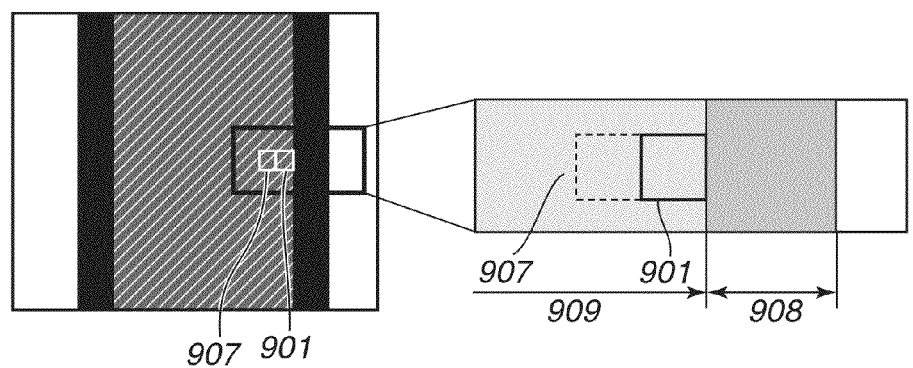
Figure 13A:
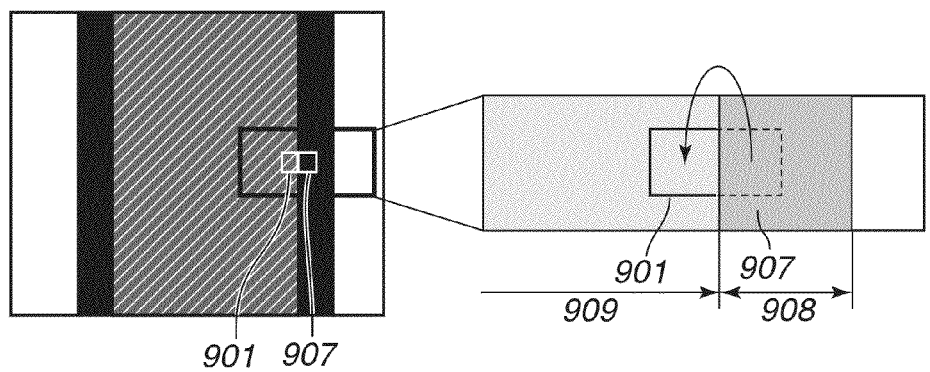
FIGS. 13A, 13B, and 13C illustrate influences of color misregistration and effects of correction through enlargement of a character portion.

FIG. 13A illustrates image data for a portion of the black character corresponding to the portion illustrated in FIG. 12 having undergone the trapping processing 508. The right-hand drawing in FIG. 13A is an enlarged view illustrating the edge area 908 and the non-edge area 909 illustrated in the left-hand drawing in FIG. 13A. In the present exemplary embodiment, the image processing unit 402 further performs processing for replacing the CMY density of pixels of the non-edge area 909 adjacent to the edge area 908 with 0 to scale down the CMY planes of the non-edge area 909. In the present exemplary embodiment, this scale-down processing will be described below as a part of the thickening processing 509 since it is performed in combination with the thickening processing 509 of the K plane. This prevents color bleeding produced by a large plane deviation. A case where the reference area 907 is used for the scale-down processing on the CMY planes will be described below.

Figure 13B:
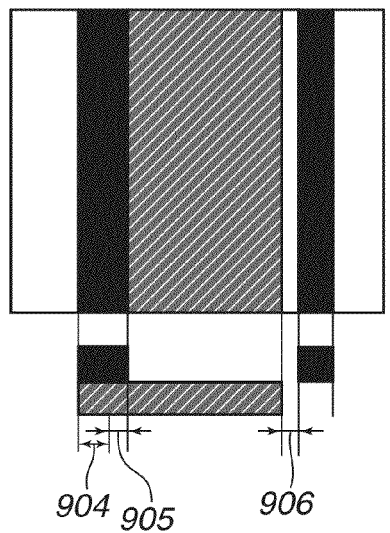

The target pixel 901 exists in the non-edge area 909, and a reference pixel exists in the reference area 907 in the edge area 908. In this case, the pixel values of the CMY planes of the reference pixel are added to the target pixel. In this case, since the reference pixel existing in the edge area 908 is processed to be K-monochromatized, the CMY density is 0, and the processed image data is as illustrated in FIG. 13B. The bottom drawing in FIG. 13B illustrates overlapping color planes in the image data having undergone the scale-down processing illustrated in the top drawing in FIG. 13B.

Figure 13C:
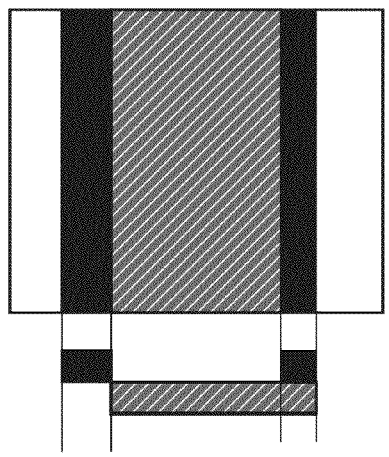

In this case, a range 904 indicates a portion where the K plane and the CMY planes overlap with each other in the trapping processing 508, as described in the first and the second exemplary embodiments, and a range 905 indicates a portion where the K plane is thickened. A range 906 indicates a portion where the density is replaced with the zero CMY density, as described above. When the image data having undergone such processing is printed in the print process in which the K plane largely shifts to the left, a white spot and color bleeding do not arise, as illustrated in FIG. 13C. Further, unlike the first and the second exemplary embodiments, the character is not thickened.

<Reference Area of CMY Planes>

In the first and the second exemplary embodiments, a reference area for thickening processing on the K plane is generated to enlarge the K plane. In the present exemplary embodiment, a reference area for the CMY planes are also generated. The reference area of the CMY planes will be described below with reference to FIG. 12C since they differ from those in the first and the second exemplary embodiments. The left-hand drawing in FIG. 12C illustrates the thickening processing 509 for adding a pixel to the target pixel 901 by using a reference area 907 which is performed on the image data in the left-hand drawing in FIG. 12A having undergone the trapping processing 508. The right-hand drawing in FIG. 12C is an enlarged view illustrating the reference area in the left-hand drawing in FIG. 12C.

A reference area is independently retained for each of the CMYK color planes. Specifically, the K plane has a shape of the reference area 903 illustrated in FIG. 12B in the first and the second exemplary embodiments so that the K plane is enlarged to the right of the target pixel by the thickening width when the trapping direction is left (i.e., the K plane is enlarged in the direction opposite to the trapping direction). On the other hand, to reduce the above-described color bleeding, the CMY planes have the reference area 907 having a shape illustrated in FIG. 12C so that the CMY planes are sequentially replaced with pixels having the zero CMY density (white pixels) by the thickening width from the right. When the image processing unit 402 performs processing for changing the CMY planes of the non-edge portion into white pixels by using the reference area 907, the non-edge portion is reduced by the thickening width (trapping width−edge width) in the trapping direction. FIG. 12C illustrates the image data having undergone the trapping processing 508, is subjected to the relevant processing, similar to FIG. 12B.

Figure 15:
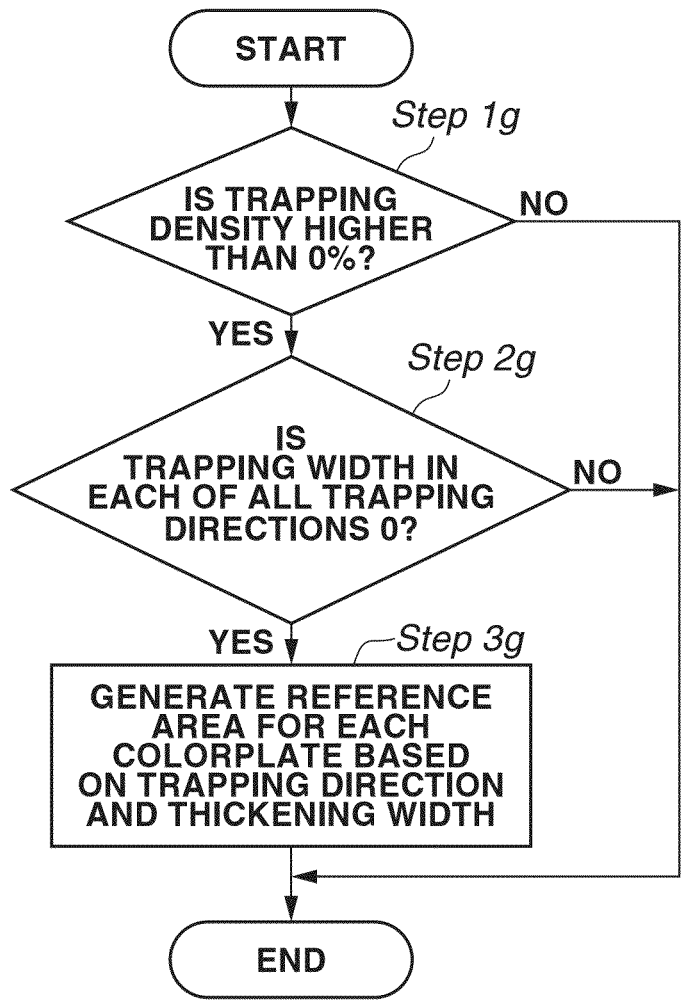
FIG. 15 is a flowchart illustrating a method for generating a reference area in thickening processing according to a third exemplary embodiment.

Reference area generation by the thickening processing 509 is performed according to processing of the flowchart illustrated in FIG. 15 instead of the flowchart illustrated in FIG. 14B. Steps 1g and 2g illustrated in FIG. 15 are similar to steps 4d and 5d illustrated in FIG. 14B according to the second exemplary embodiment.

In step 3g, the image processing unit 402 generates a reference area for each color plane based on the trapping direction and the thickening width. Specifically, the reference area of the K plane is generated as an area having reference pixels in the same direction as the specified trapping direction. On the other hand, the reference area of the CMY planes is generated as an area having reference pixels in the direction opposite to the specified trapping direction. This completes descriptions of the reference area of the CMY planes.

Therefore, when the target pixel 901 is a non-edge pixel adjacent to the edge area 908, as illustrated in FIGS. 12C and 13A, the reference area of the K plane is the reference area 903, as illustrated in FIG. 12C. On the other hand, the reference area of the CMY planes is the reference area 907, as illustrated in FIG. 13A.

<Thickening Processing Using Reference Area>

Figure 16:
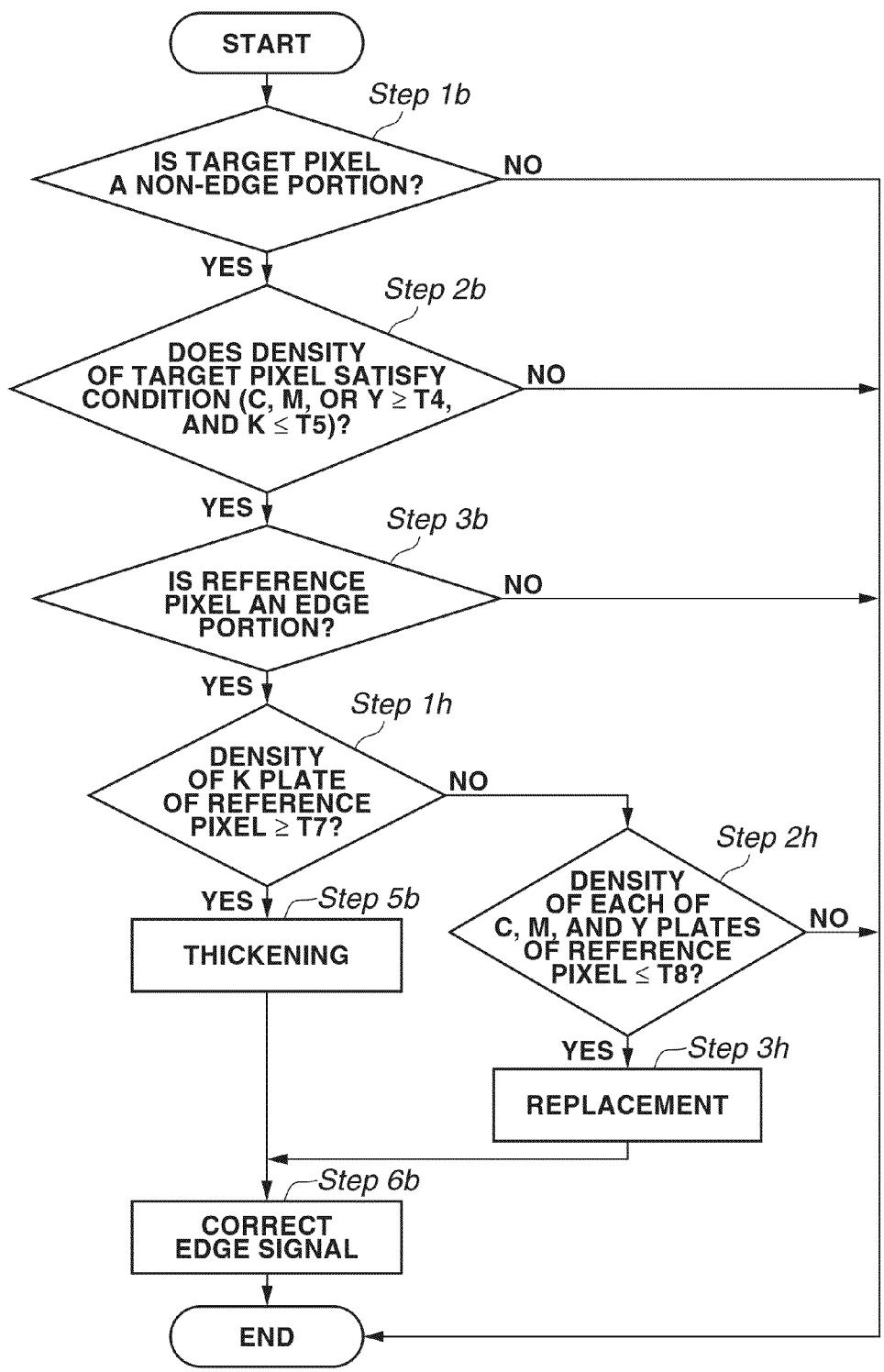
FIG. 16 is a flowchart illustrating the thickening processing according to the third exemplary embodiment.

Lastly, thickening processing including non-edge portion scale-down processing will be described below with reference to the flowchart illustrated in FIG. 16. Unless otherwise noted, steps in this flowchart performing similar processing to those in the flowchart illustrated of FIG. 11 described in the first exemplary embodiment are assigned the same reference numerals.

Figure 11:
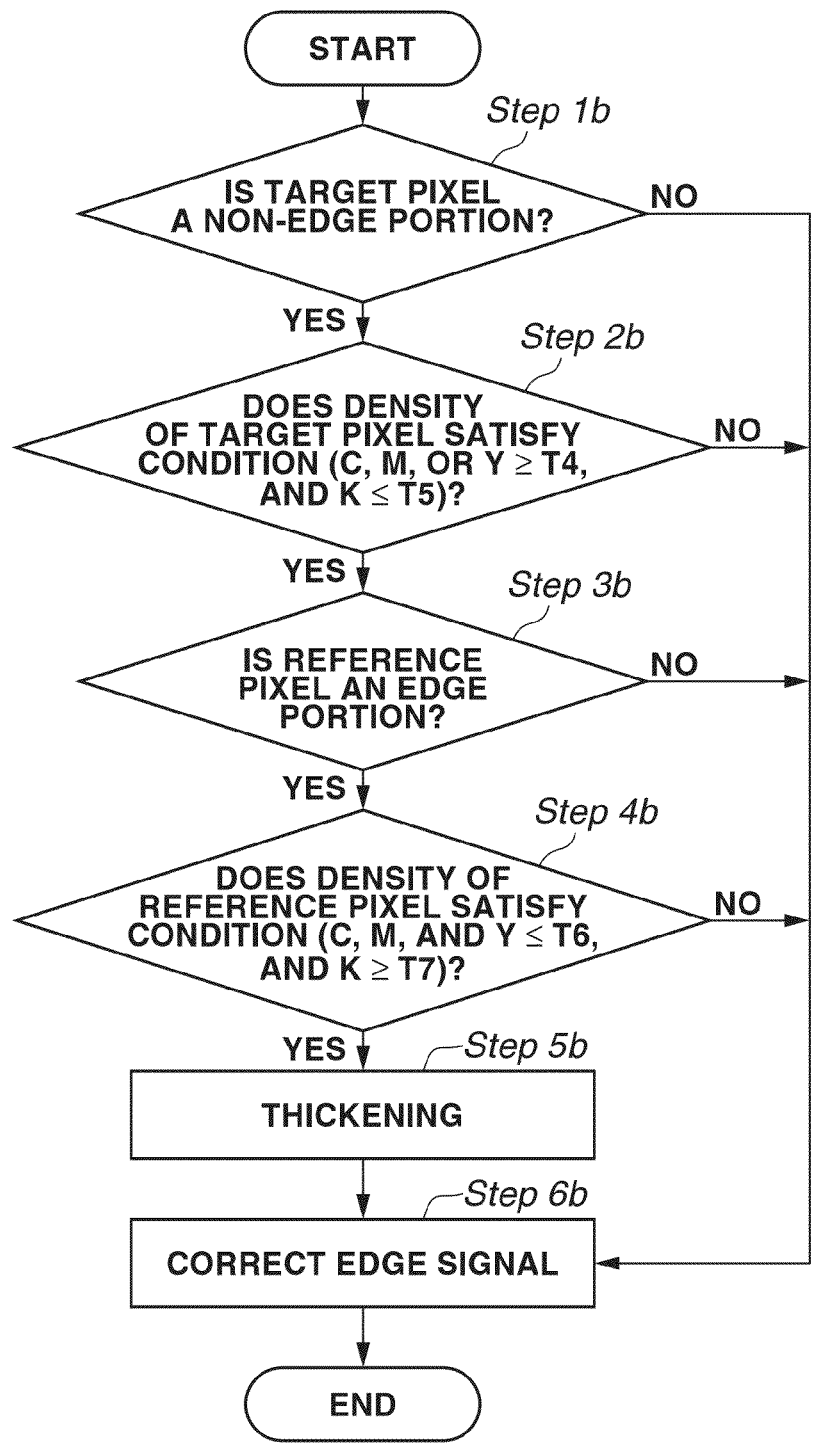
FIG. 11 is a flowchart illustrating trapping processing.

Although step 2b is almost similar to step 2b illustrated in FIG. 11, the value of the threshold value T4 is different. The threshold value T4 in this flowchart is, for example, set to 50. Thus, by setting T4 to 50, not to 0, the target pixel having a not low CMY density and a low K density can be subjected to processing in step 5b or 3h. Specifically, as illustrated in FIG. 13B, the left-hand edge portion of the K plane is enlarged to the right while the right-hand edge portion of the K plane is not enlarged to the right.

In step 3b, the image processing unit 402 determines whether each reference pixel belongs to the edge portion. In this case, the image processing unit 402 performs the determination for each color plane since the reference area differs for each of the CMYK color planes. When none of reference pixels belongs to the edge portion in the reference area of all color planes (NO in step 3b), the processing exits this flowchart. On the other hand, when any one of reference pixels belongs to the edge portion (YES in step 3b), the processing proceeds to step 1h.

In step 1h, the image processing unit 402 determine whether the K density of the relevant reference pixel is high. Specifically, the image processing unit 402 determines whether the K density of the reference pixel in the reference area of the K plane is T7 or higher. When the K density of the reference pixel in the reference area of the K plane is determined to be the predetermined density T7 or higher (YES in step 1h), the processing proceeds to step 5b. On the other hand, when the K density is determined to be lower than the predetermined density T7 (NO in step 1h), the processing proceeds to step 2h. In the present exemplary embodiment, T7 indicates a comparatively high density, such as 125. When the thickening processing in step 5b is performed based on the determination, the K plane of the left-hand edge portion is enlarged, and the area 905 of the K plane arises, as illustrated in FIG. 13B.

In step 2h, the image processing unit 402 determines whether the CMY density of the reference pixel is low. Specifically, the image processing unit 402 determines whether the CMY density of the reference pixel in the reference area of the CMY planes is a density T8 or lower. When the CMY density of the reference pixel in the reference area of the CMY planes is the predetermined density T8 or lower (YES in step 2h), the processing proceeds to step 3h. On the other hand, when the CMY density is higher than the predetermined density T8 (NO in step 2h), the processing exits this flowchart. In the present exemplary embodiment, T8 is set to 0. Thus, in the replacement processing in the following step 3h, the CMY density of the target pixel can be replaced with the density of the reference pixel having the zero CMY density.

In step 3h, the image processing unit 402 replaces the CMY density of the target pixel with the CMY density of the reference pixel. As a result of this processing, a white pixel area corresponding to the range 906 is generated, as illustrated in FIG. 13B. The range 906 is generated because the CMY planes of the non-edge portion are reduced by a width (trapping width−edge width) in the trapping direction.

Based on the determination in step 1h and the determination in step 2h, the above-described processing performs enlargement of the K plane and reduction of the CMY planes, respectively. Therefore, even in the case of a large amount of plane deviation, a white spot and color bleeding can be prevented without changing the character width.

The first to the third exemplary embodiments have been described above based on a case where the image processing unit 402 has the configuration illustrated in FIG. 5. Specifically, a solution in the case of a large plane deviation is provided by the combination of two pieces of processing (the trapping processing 508 and the thickening processing 509). In the present exemplary embodiment, a case where the plane deviation or the trapping width is larger than a predetermined value (a preset value or an extracted edge width) will be described below. Operations in the case where the plane deviation or the trapping width is equal to or smaller than a predetermined value (a preset value or an extracted edge width) are similar to operations according to the first exemplary embodiment, except that the thickening processing 509 is not performed, and redundant descriptions of the case will be omitted.

Figure 6:
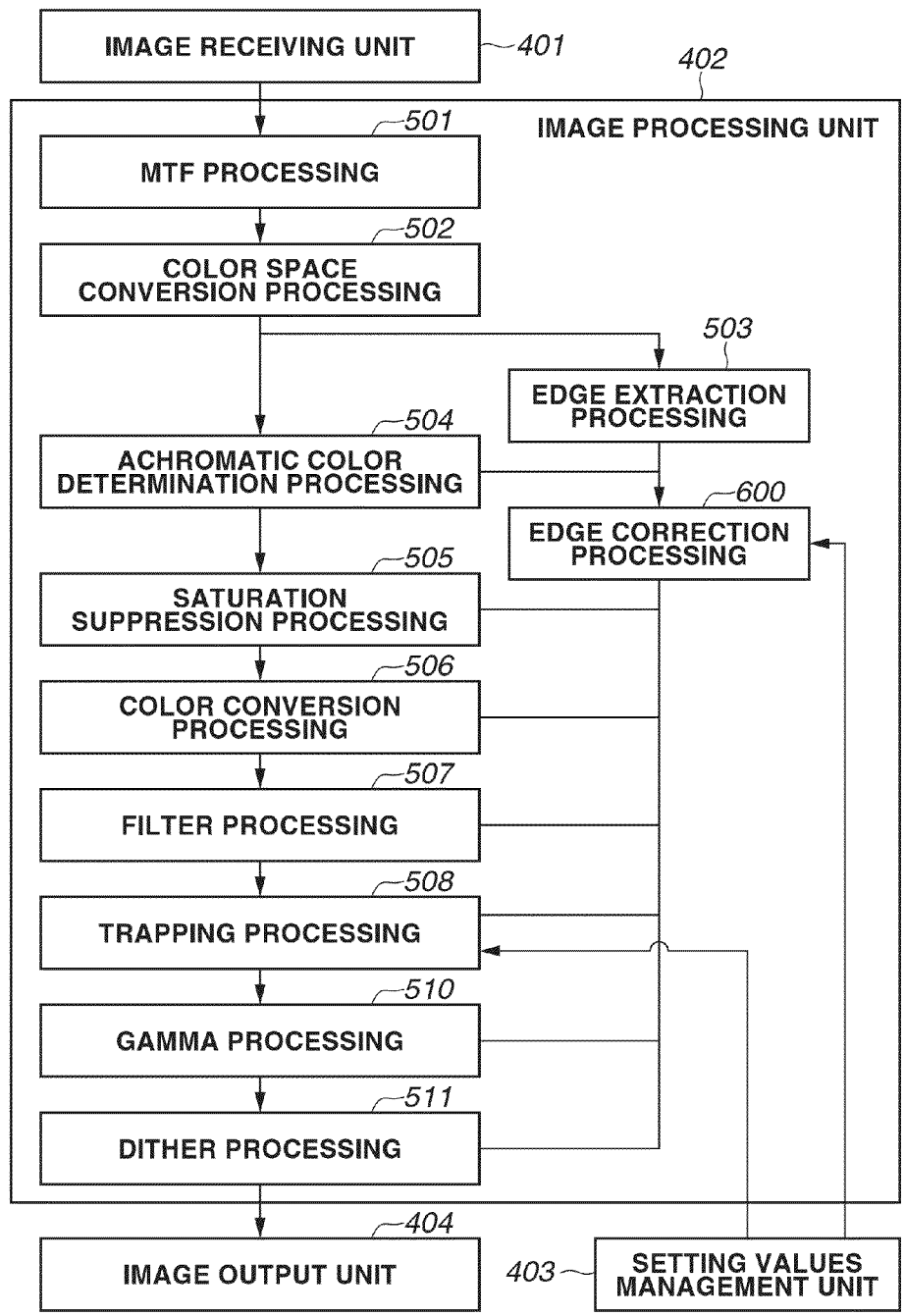
FIG. 6 illustrates another image processing configuration in the image processing circles.

With reference to the image processing unit 402 according to the present exemplary embodiment, an example processing is described in which edge correction processing 600 is further performed after edge extraction. The image processing unit 402 according to the present exemplary embodiment will be described below with reference to the configuration thereof illustrated in FIG. 6. Each piece of processing performed by the image processing unit 402 illustrated in FIG. 6 is implemented when the CPU 211 executes a control program stored in the ROM 212.

Figure 17:
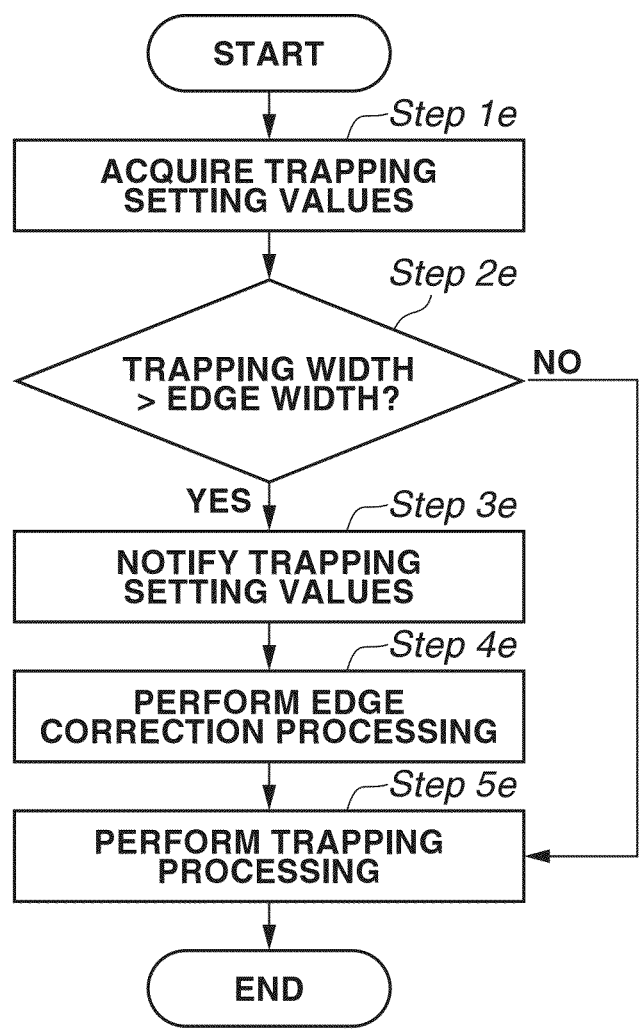
FIG. 17 is a flowchart illustrating trapping processing according to a fourth exemplary embodiment.

The configuration of the image processing unit 402 illustrated in FIG. 6 will be described below with reference to the flowchart FIG. 17. As for the processing described in the first exemplary embodiment, redundant descriptions will be omitted. The flowchart illustrated in FIG. 17 is implemented when the CPU 211 executes a control program stored in the ROM 212, and executed in the image processing unit 402.

In step 1e, the setting values management unit 403 acquires trapping setting values. Then, the processing proceeds to step 2e.

In step 2e, the setting values management unit 403 compares the trapping width with the edge width extracted by the edge extraction processing 503. In this case, the edge width is prestored in the setting values management unit 403. When the trapping width is larger than the edge width (YES in step 2e), the processing proceeds to step 3e. On the other hand, when the trapping width is equal to or smaller than the edge width (NO in step 2e), the processing proceeds to step 5e.

In step 3e, the setting values management unit 403 notifies the edge correction processing 600 and the trapping processing 508 of the trapping setting values. In this case, the trapping direction and the trapping width are notified to the edge correction processing 600, and the trapping direction, the trapping width, and the trapping density are notified to the trapping processing 508. Then, the processing proceeds to step 4e.

In step 4e, the edge correction processing 600 performs edge correction based on the information notified from the setting values management unit 403. The information about the corrected edge is used by processing ranging from the saturation suppression processing 505 to the dither processing 511. The edge correction will be described in detail below. Then, the processing proceeds to step 5e.

In step 5e, the image processing unit 402 performs the trapping processing 508. The trapping processing 508 have been described in detail in the first exemplary embodiment, and duplicated descriptions thereof will be omitted.

This completes descriptions of the configuration of the image processing unit 402 illustrated in FIG. 6.

<Edge Correction Processing>

The edge correction processing 600 described in step 4e will be described in detail below with reference to the flowchart FIG. 18.

In step 1f, the edge correction processing 600 generates a reference area based on the information notified from the setting values management unit 403.

In this case, the edge correction processing 600 acquires the trapping width, the trapping direction, and the edge width from the setting values management unit 403, and generates a reference area according to these pieces of information. For example, when the trapping width is 3 pixels, the trapping direction is LEFT, and the edge width is 2 pixels, the edge correction processing 600 generates a 1×((trapping width−edge width)×2+1) area as a reference area. This reference area is a 1×3 area in which the target pixel is sandwiched by two (right and left) reference pixels. Specifically, the generated reference area includes the target pixel and reference pixels by (trapping width−edge width) in the trapping direction and in the opposite direction from the target pixel.

When a non-edge pixel (described below) is corrected by using such a reference area, for example, pixels adjacent to the edge portions on both sides of the non-edge portion 705 illustrated in FIG. 7C can be recognized as edge pixels. Referring to the example illustrated in FIG. 7C, the number of pixels recognized as edge pixels inwardly increases. Therefore, when the processing in the following stages (the saturation suppression processing 505 to the dither processing 511) is performed, the width of the K-monochromatized edge portions at both ends including the edge portion 702 becomes larger than the edge width extracted by the edge extraction processing 503, as illustrated in the example in FIG. 7B. As a result, sufficient object enlargement can be performed by the trapping processing 508, making it possible to prevent a white spot between the edge portion 702 and the non-edge portion 703. Further, since the width of the K-monochromatized right-hand edge portion increases, the non-edge portion 703 can be prevented from protruding from the right-hand edge portion even if the K plane largely shifts to the left.

In step 2f, the edge correction processing 600 determines whether the target pixel belongs to the non-edge portion. When the target pixel belongs to the non-edge portion (YES in step 2f), the processing proceeds to step 3f. On the other hand, when the target pixel belongs to the edge portion (NO in step 2f), the processing exits this flowchart.

In step 3f, the edge correction processing 600 determines whether any one of reference pixels belongs to the edge portion. When any one of reference pixels belongs to the edge portion (YES in step 3f), the processing proceeds to step 4f. On the other hand, when none of reference pixels belongs to the edge portion (NO in step 3f), the processing exits this flowchart.

In step 4f, the edge correction processing 600 determines whether the reference pixel is achromatic. When the reference pixel is determined to be achromatic (YES in step 4f), the processing proceeds to step 5f. On the other hand, when the reference pixel is determined to be not achromatic (NO in step 4f), the processing exits this flowchart. The method described in the first exemplary embodiment or other well-known methods are used to perform achromatic color determination. In step 4f, the edge correction processing 600 may also determine whether the target pixel is achromatic. In this case, when both the reference pixel and the target pixel are determined to be achromatic (YES in step 4f), the processing proceeds to step 5f. On the other hand, when either of the reference pixel or the target pixel is determined to be not achromatic (NO in step 4f), the processing exits this flowchart. In this achromatic color determination, the edge correction processing 600 may determine whether the density of the achromatic color plane of the target pixel is smaller than a predetermined threshold value.

In step 5f, the edge correction processing 600 corrects and determines the target pixel belonging to the non-edge portion as an achromatic pixel belonging to the edge portion. Specifically, it is determined that the target pixel adjacent to a reference pixel which belongs to the edge portion and is achromatic, also belongs to the edge portion and is achromatic in the saturation suppression processing 505 to the dither processing 511. As a result, K-monochromatization processing (the saturation suppression processing 505 to the dither processing 511) is performed on the target pixel determined as belonging to the edge portion and achromatic.

With the above-described processing, the areas corresponding to the ranges 905 and 906 illustrated in FIG. 13B are handled in the saturation suppression processing 505 to the dither processing 511 as achromatic edge portions. As a result, even when the specified trapping width is thicker than the edge width, the achromatic edge portion to be K-monochromatized can be thickened toward the inside of the character. As a result, the trapping processing 508 can be carried out by the specified trapping width without thickening the character width.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-143699 filed Jul. 9, 2013, which is hereby incorporated by reference herein in its entirety.

What is claimed is:

1. An image processing apparatus comprising:
an input unit configured to input image data;
a first determination unit configured to determine whether a pixel included in the input image data belongs to an edge;
a second determination unit configured to determine whether a pixel included in the input image data is achromatic;
a stressing processing unit configured to stress density of the pixel determined to belong to an edge by the first determination unit; and
a processing unit configured to perform a process for forming a pixel only with an achromatic color material on a pixel determined to belong to an edge and to be achromatic by the first and the second determination units,
wherein, in a case where the pixel has been determined as belonging to belong to an edge and to be achromatic, the processing unit determines whether the process is to be performed on a pixel adjacent to the pixel which has been determined to belong to an edge and to be achromatic, and, in a case where it has been determined that the process is to be performed, performs the process on the adjacent pixel.

2. The image processing apparatus according to claim 1, wherein, in a case where the adjacent pixel is determined to be achromatic, the processing unit determines that the process is to be performed on the adjacent pixel.

3. The image processing apparatus according to claim 1, wherein the first determination unit performs filter processing on the input image data, performs threshold value processing on a pixel included in the image data having undergone the filter processing, and determines whether the pixel belongs to an edge based on a result of the threshold value processing.

4. The image processing apparatus according to claim 1, wherein, in a case where a color difference of a pixel included in the input image data is smaller than a threshold value, the second determination unit determines that the pixel with a color difference smaller than a threshold value is achromatic.

5. The image processing apparatus according to claim 1, wherein the input unit reads a document to input the image data.

6. The image processing apparatus according to claim 1, wherein the input image data is red, green, and blue image data, and
wherein the process equalizes amounts of red, green, and blue components, and converts a pixel having equal amounts of the components into image data having a density of a black color plane.

7. The image processing apparatus according to claim 1, wherein, in a case where the adjacent pixel has a density higher than a predetermined density and is achromatic, the processing unit performs monochromatization processing on the adjacent pixel.

8. The image processing apparatus according to claim 1, wherein, in a case where a color difference of the pixel included in the input image data determined as belonging to an edge is smaller than a threshold value, the second determination unit determines the pixel determined to belong to an edge as achromatic.

9. An image processing method comprising:
inputting image data;
determining whether a pixel included in the input image data belongs to an edge;
determining whether a pixel included in the input image data is achromatic;
stressing density of the pixel determined to belong to an edge;
performing a process for forming a pixel only with an achromatic color material on a pixel determined to belong to an edge and to be achromatic; and
in a case where the pixel has been determined as belonging to an edge and being achromatic, (i) determining whether the process is to be performed on a pixel adjacent to the pixel which has been determined to belong to an edge and to be achromatic, and, (ii) in a case where it has been determined that the process is to be performed, performing the process on the adjacent pixel.

10. An image processing apparatus comprising:
an input unit configured to input image data;
an achromatic edge identification unit configured to identify an achromatic edge portion in the input image;
a processing unit configured to perform a color conversion on the input image, wherein the processing unit converts color of the identified achromatic edge portion in the input image from an achromatic color to a mono color in the color conversion; and
an enlargement unit configured to identify a mono color edge portion in the color converted image obtained by performing the color conversion and to enlarge the identified mono color edge portion, wherein the enlargement unit enlarges the identified mono color edge portion on which the color conversion has been performed and does not enlarge the identified mono color edge portion on which the color conversion has not been performed.

11. The image processing apparatus according to claim 10, wherein the mono color is a black color.

12. The image processing apparatus according to claim 10, wherein the input image is an RGB (red, green, blue) image obtained from a scanner.

13. The image processing apparatus according to claim 10, wherein the achromatic edge identification unit comprises:

an edge identification unit configured to identify edge portions in the input image, the identified edge portions including the achromatic edge portion and a chromatic edge portion; and an achromatic determination unit configured to determine whether each of the identified edge portions is achromatic or chromatic, so as to identify the achromatic edge portion, and wherein the enlargement unit comprises:

an edge enhancement unit configured to perform an edge enhancement process on portions in the color converted image which are the edge portions identified by the edge identification unit.

14. The image processing apparatus according to claim 13, wherein the edge enhancement unit is controlled not to perform the edge enhancement process on a portion enlarged from the mono color edge portion.

\* \* \* \* \*